(12) United States Patent
Painter et al.

(10) Patent No.: US 8,849,075 B2
(45) Date of Patent: Sep. 30, 2014

(54) SYSTEMS AND METHODS FOR TUNING A CAVITY

(71) Applicant: California Institute of Technology, Pasadena, CA (US)

(72) Inventors: Oskar Painter, Sierra Madre, CA (US); Martin Winger, Pasadena, CA (US); Qiang Lin, Rochester, NY (US); Amir Safavi-Naeini, Pasadena, CA (US); Thiago Alegre, Campinas (BR); Timothy Dobson Blasius, Pasadena, CA (US); Alexander Grey Krause, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 69 days.

(21) Appl. No.: 13/673,916

(22) Filed: Nov. 9, 2012

(65) Prior Publication Data

US 2013/0121633 A1    May 16, 2013

Related U.S. Application Data

(60) Provisional application No. 61/558,620, filed on Nov. 11, 2011.

(51) Int. Cl.
*G02B 6/12* (2006.01)
*G02B 26/00* (2006.01)
*G02B 6/122* (2006.01)

(52) U.S. Cl.
CPC ............ *G02B 6/1225* (2013.01); *G02B 26/001* (2013.01)
USPC .................... 385/14; 385/129; 385/9; 385/16

(58) Field of Classification Search
USPC ............................ 385/14, 4, 40, 129, 9, 8, 16
See application file for complete search history.

(56) References Cited

U.S. PATENT DOCUMENTS

| | | | |
|---|---|---|---|
| 6,058,127 A | 5/2000 | Joannopoulos et al. | |
| 6,468,823 B1 | 10/2002 | Scherer et al. | |
| 8,606,060 B2 * | 12/2013 | Hamann et al. | 385/40 |
| 2002/0048422 A1 * | 4/2002 | Cotteverte et al. | 385/4 |
| 2005/0201660 A1 * | 9/2005 | Grot et al. | 385/12 |
| 2006/0280396 A1 * | 12/2006 | Wu | 385/4 |
| 2009/0238528 A1 * | 9/2009 | Spillane et al. | 385/129 |
| 2013/0054454 A1 | 2/2013 | Purves et al. | |
| 2013/0159154 A1 | 6/2013 | Purves et al. | |
| 2013/0246261 A1 | 9/2013 | Purves et al. | |

OTHER PUBLICATIONS

Nunnenkamp, A., et al., "Cooling and squeezing via quadratic optomechanical coupling," Physical Review, vol. A 82, pp. 021806-1-021806-4 (2010).

Olivero, J.J., and Longbothum, R.L., "Empirical fits to the Voigt line width: A brief review," Journal of Quantitative Spectroscopy and Radiative Transfer, vol. 17, Issue 2, pp. 233-236, Feb. 1977.

(Continued)

*Primary Examiner* — Ellen Kim
(74) *Attorney, Agent, or Firm* — Turk IP Law, LLC

(57) ABSTRACT

The present disclosure describes an integrated opto-mechanical and electro-mechanical system. The opto-mechanical and electro-mechanical system can be made of photonic crystals configured to move based on electrical voltages and/or back action effects from electromagnetic waves, thus changing the resonance of the system.

30 Claims, 21 Drawing Sheets

(56) References Cited

OTHER PUBLICATIONS

Perahia, R., et al., "Electrostatically tunable optomechanical "zipper" cavity laser," Applied Physics Letters, vol. 97, No. 19, pp. 191112-1-191112-3 (2010).
Regal, C.A., "Measuring nanomechanical motion with a microwave cavity interferometer," Nature Physics, vol. 4, No. 7, pp. 555-560 (2008).
Rosenberg, J., et al., "Static and dynamic wavelength routing via the gradient optical force," Nature Photonics, vol. 3, No. 8, pp. 478-483 (2009).
Safavi-Naeini, A. H., "Electromagnetically induced transparency and slow light with optomechanics," Nature, vol. 472, No. 7341, pp. 69-73 (2011).
Safavi-Naeini, A.H., and Painter, O., et al., "Proposal for an optomechanical travelling wave phonon-photon translator," New Journal Physics, vol. 13, No. 013017, pp. 1-30 (2011).
Safavi-Naeini, A.H., et al., "Optomechanics in an ultrahigh-Q two dimensional photonic crystal cavity," Applied Physics Letter, vol. 97 No. 18, pp. 181106-1-181106-3 (2010).
Schliesser, A., "Highsensitivity monitoring of micromechanical vibration using optical whispering gallery moderesonators," New Journal of Physics, vol. 10, No. 095015, pp. 1-19 (2008).
Serafini, A., et al, "Generation of continuous variable squeezing and entanglement of trapped ions in time-varying potentials," Quantum Information Processing, vol. 8, pp. 619-630, Apr. 2009.
Song, B-S., et al., "Ultra-high-Q photonic double-heterostructure nanocavity," Nature Materials, vol. 4, No. 3, pp. 207-210 (2010).
Sridaran, S., and Bhave, S.A., "Electrostatic acuation of silicon optomechanical resonators," Optics Express, vol. 19, No. 10, pp. 7 (2011).
Stowe, T.D., et al, "Attonewton force detection using ultrathin silicon cantilevers," Applied Physics Letters, vol. 71, Issue 2, pp. 288-290 (1997).
Sun, X., "A superhigh-frequency optoelectromechanical system based on a slotted photonic crystal cavity," Applied Physics Letters, vol. 101, Issue 22, pp. 221116-1-221116-5, American Institute of Physics (2012).
Tadigadapa, S., and Mateti, K., Piezoelectric MEMS sensors: state-of-the-art and perspectives Measurement Science and Technology, vol. 20, No. 9, p. 092001 (2009).
Teufel, J. D., "Sideband cooling of micromechanical motion to the quantum ground state," Nature, vol. 475, No. 7356, pp. 359-363 (2011).
Teufel, J.D., "Circuit cavity electromechanics in the strong-coupling regime," Nature, vol. 471, No. 7337, pp. 204-208 (2011).
Thompson, J.D., et al., "Strong dispersive coupling of a high-finesse cavity to micromechnical membrane," Nature, vol. 452, pp. 72-75 (2008).
Thourhout, D.V., and Roels, J., "Optomechanical device actuation through the optical gradient force," Nature Photonics, vol. 4, pp. 211-217 Macmillan Publishers Limited (2010).
Weis, S., et al., "Optomechanically Induced Transparency," Science, vol. 330, No. 6010, pp. 1520-1523 (2010).
Winger, M., et al., "A chip-scale integrated cavity-electro-optomechanics platform," Optics Express, vol. 19, No. 25, pp. 17 (2011).
Woolley, M.J., et al, "Nanomechanical squeezing with detection via a microwave cavity," Physical Review, vol. 78, No. 06, pp. 062303-1-062303-12 (2008).
Wu, J., et al, "A Low-Noise Low-Offset Capacitive Sensing Amplifier for a 50-µg Hz Monolithic CMOS MEMS Accelerometer," IEEE Journal of Solid-State Circuits, vol. 39, No. 5, pp. 722-730 (2004).
Yazdi, N., and Najafi, K., et al., "Performance limits of a closed-loop micro-g silicon accelerometer with deposited rigid electrodes," Proceedings of the 12th International Conference on Microelectronics, pp. 313-316 (2000).
Yazdi, N., et al, "A high-sensitivity silicon accelerometer with a folded-electrode structure," Journal of Microelectromechanical Systems, vol. 12, Issue 4, pp. 479-486 (2003).
Yazdi, N., et al, "Micromachined inertial sensors," Proceeding of the IEEE, vol. 86, No. 8, pp. 1640-1659 (1998).
Yazdi, N., et al, "Precision readout circuits for capacitive microaccelerometers," Proceedings of IEEE Sensors, vol. 1, pp. 28-31 (2004).
Yin, L., et al., "A low-noise CMOS interface circuit for closed-loop accelerometer," 4th IEEE International Conference on Nano/Micro Engineered and Molecular Systems, pp. 502-505 (2009).
Zwahlen, P., et al, "Navigation grade MEMS accelerometer," IEEE 23rd International Conference on Micro Electro Mechanical Systems (MEMS), pp. 631-634 (2010).
"Cavity opto-mechanics," wikipedia, accessed at http://web.archive.org/web/20131102145212/http://en.wikipedia.org/wiki/Cavity_opto-mechanics, last modified on Oct. 16, 2013, pp. 1-5.
"RF MEMS," Wikipedia, accessed at http://web.archive.org/web/20100726064442/http://en.wikipedia.org/wiki/RF_MEMS, last modified Jul. 22, 2010, pp. 1-10.
Albrecht, T.R., et al., "Frequency modulation detection using high-Q cantilevers for enhanced force microscope sensitivity," Journal of Applied Physics, vol. 69, No. 2, pp. 668-673 (1991).
Alegre, T.P.M, et al., "Optomechanical zipper cavity lasers: theoretical analysis of tuning range and stability," Optic Express, vol. 18, No. 8, pp. 7872-7885 (2010).
Arcizet, O., et al., "Radiation-pressure cooling and optomechanical instability of a micro-mirror," Nature, vol. 444, No. 7115, pp. 71-74 (2006).
Arlett, J.L., et al, "Self-Sensing Micro- and Nanocantilevers with Attonewton-Scale Force Resolution," Nano Letter, vol. 6, No. 5, pp. 1000-1006, American Chemical Society (2006).
Ashkin, A., "Acceleration and Trapping of Particles by Radiation Pressure," Physical Review Letter, vol. 24, No. 4, pp. 156-159 (1970).
Barclay, P.E, et al., "Nonlinear response of silicon photonic crystal microresonators excited via an integrated waveguide and fiber taper," Optic Express, vol. 13, No. 3, pp. 801-820 (2005).
Binnig, G., and Quate, C.F., "Atomic Force Microscope," Physical Review Letter, vol. 56, No. 9, pp. 930-933 (1986).
Braginsky, V.B., et al., "Quantum nondemolition measurements," Science, vol. 209, No. 4456, pp. 547-557 (1980).
Chan, J., et al., "Laser cooling of a nanomechanical oscillator into its quantum ground state," Nature, vol. 478, pp. 89-92 (2011).
Cooper, E.B., et al, "High-resolution micromachined interferometric accelerometer," Applied Physics Letters, vol. 76, No. 22, pp. 3316-3318 (2000).
Eichenfield, M., et al., "A picogram- and nanometre-scale photonic-crystal optomechanical cavity," Nature, vol. 459, No. 7246, pp. 550-556 (2009).
Eichenfield, M., et al., "Optomechanical crystals," Nature, vol. 462, No. 7269, pp. 78-82 (2009).
Ekinci, K.L., and Roukes, M.L., "Nanoelectromechanical systems," Review of Scientific Instrument, vol. 76, pp. 061101-1-061101-12 (2005).
Favero, I., and Karrai, K., "Optomechanics of deformable optical cavities," Nature Photonics, vol. 3, No. 4, pp. 201-205, Macmillan Publishers Limited (2009).
Fleming, W.J., "New Automotive Sensors—A Review," IEEE Sensors Journal, vol. 8, Issue 11, pp. 1900-1921 (2008).
Frank, I.W., et al., "Programmable photonic crystal nanobeam cavities," Optics Express, vol. 18, No. 8, pp. 8705-8712 (2010).
Gabrielson, T. B., "Mechanical-thermal noise in micromachined acoustic and vibration sensors," IEEE Transaction on Electron Devices, vol. 40, Issue 5, pp. 903-909, May 1993.
Gavartin, E., et al., "Optomechanical coupling in a two-dimensional photonic crystan defect cavity," Physical Review Letter, vol. 106, No. 20, pp. 203902-1-203902-4, American Physical Society (2011).
Gigan, S., et al., "Self-cooling of a micro-mirror by radiation pressure," Nature, vol. 444, No. 7115, pp. 67-70 (2006).
Gong, Y., et al., "Low power resonant optical excitation of an optomechanical cavity," Optics Express, vol. 19, No. 2, pp. 12 (2011).
Gröblacher, S., "Demonstration of an ultracold micro-optomechanical oscillator in a cryogenic cavity," Nature Physics, vol. 5, No. 7, pp. 485-488 (2009).

(56) References Cited

OTHER PUBLICATIONS

Jiang, Y.G., et al, "Fabrication of piezoresistive nanocantilevers for ultra-sensitive force detection", Measurement Science and Technology, vol. 19, No. 8, p. 084011 (2008).

Johnson, S.G., et al., "Perturbation theory for Maxwell's equations with shifting material boundaries," Physical Review E, vol. 65, pp. 066611-1-066611-4 (2002).

Kenny, T., "Nanometer-Scale Force Sensing with MEMS Devices," IEEE Sensors Journal, vol. 1, Issue 2, pp. 148-157, Aug. 2001.

Kippenberg, T. J., "Analysis of Radiation-Pressure Induced Mechanical Oscillation of an Optical Microcavity," Physical Review Letter, vol. 95, No. 3, pp. 033901-1-033901-4 (2005).

Kippenberg, T. J., and Vahala, K. J., "Cavity Opto-Mechanics," Optical Society of America, pp. 1-21 (2007).

Kippenberg, T. J., and Vahala, K. J., "Cavity Optomechanics: Back-Action at the Mesoscale," Science, vol. 321, No. 5893, pp. 1172-1176 (2008).

Kippenberg, T., "Cavity Optomechanics: Back-action Cooling of Mechanical Oscillators," p. 1-1 (Abstract).

Kleckner, D., and Bouwmeester, D., "Sub-kelvin optical cooling of a micromechanical resonator," Nature, vol. 444, No. 7115, pp. 75-78 (2006).

Krause, A.G., et al., "A high-resolution microchip optomechanical accelerometer," Nature Photonics, vol. 6, pp. 768-772 (2012).

Krishnan, G., et al, "Micromachined High-Resolution Accelerometers," Journal of the Indian Institute of Science, vol. 87, No. 3, pp. 333-361 (2007).

Kulah, H., et al, "Noise analysis and characterization of a sigma-delta capacitive microaccelerometer", IEEE J. Sol-Stat. Circ. 41, 352 (2006).

Lee, K. H., et al., "Cooling and Control of a Cavity Opto-electromechanical System," Phys. Rev. Lett. vol. 104, No. 12, pp. 123604-1-123604-4, Feb. 2010.

Li, Y., et al., "Design of dispersive optomechanical coupling and cooling in ultrahigh-Q/V slot-type photonic crystal cavities," Optics Express, vol. 18, No. 23, pp. 13 (2010).

Lin, Q., et al., "Mechanical Oscillation and Cooling Actuated by the Optical Gradient Force," Physical Review Letter, vol. 103, pp. 1103601-1-1103601-4 (2009).

Liu, C-H., and Kenny, T.W., "A high-precision, wide-bandwidth micromachined tunneling accelerometer," Journal of Microelectromechanical Systems, vol. 10, Issue 3, pp. 425-433, Sep. 2001.

Loh, N.C., et al., "Sub-10 cm3 Interferometric Accelerometer with Nano-g Resolution," Journal of Microelectromechanical Systems, vol. 11, No. 3, pp. 182-187 (2002).

Lopez, D., et al., "MEMS-based force sensor: Design and applications," Bell Lab Technical Journal, vol. 10, No. 3, pp. 61-80, Jan. 2005.

Mamin, H.J., and Rugar, D., et al, "Sub-attonewton force detection at millikelvin temperature," Applied Physics Letters, vol. 79, Issue 20, pp. 3358-3360, Nov. 2001.

Mari, A., and Eisert, J., "Gently modulating optomechanical systems," Phys. Rev. Lett., vol. 103, No. 213603, pp. 1-7 (2009).

Marquardt, F., and Girvin, S.M., "Optomechanics," Physics, vol. 2, No. 40, pp. 7 (2009).

Marquardt, F., et al., "Quantum theory of Cavity-Assisted Sideband Cooling of Mechanical Motion," Physical. Review Letter, vol. 99, pp. 093902-1-093902-4 (2007).

Michael, C.P., et al., "An optical fiber-taper probe for wafer-scale microphotonic device characterization," Optic Express, vol. 15, No. 8, pp. 4745-4752 (2010).

Midolo, L., "Electromechanical wavelength tuning of double-membrane photonic crystal cavities," Applied Physics Letters, vol. 98, No. 21, pp. 9 (2011).

Mohd-Yasin, F., et al, "Noise in MEMS," Measurement Science Technology, vol. 21, No. 1, pp. 1-22 (2010).

Müller, D.J., and Dufrêne, Y.F., "Atomic force microscopy as a multifunctional molecule toolbox in nanobiotechnology," Nature Nanotech, vol. 3, pp. 261-269 (2008).

Murch, K.W., et al., "Observation of quantum-measurement backaction with an ultracold atomic gas," Nature Physics, vol. 4, pp. 561-564 (2008).

\* cited by examiner

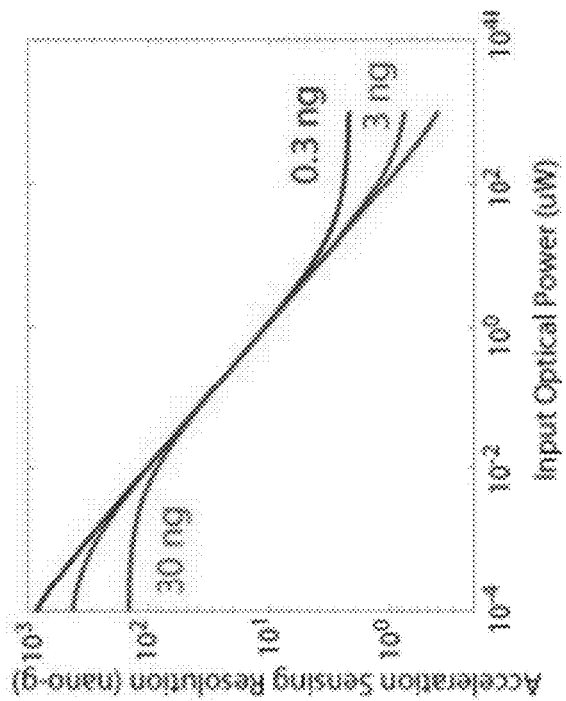
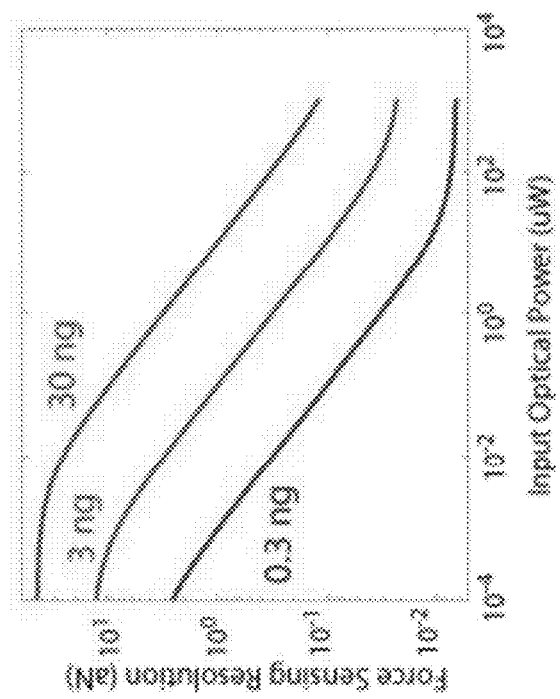

US 8,849,075 B2

SYSTEMS AND METHODS FOR TUNING A CAVITY

CROSS REFERENCE TO RELATED APPLICATIONS

This application claims priority to U.S. provisional application 61/558,620 filed on Nov. 11, 2011, the content of which is incorporated herein by reference in its entirety.

STATEMENT OF GOVERNMENT GRANT

This invention was made with government support under FA9550-10-1-0284 awarded by the Air Force. The government has certain rights in the invention.

FIELD

The present disclosure relates to optomechanical and/or electromechanical devices. More in particular, it relates to systems and methods for tuning a cavity.

BACKGROUND

Sensitive force detection can be used in a variety of applications ranging from atomic force microscopy [33,34], biomolecule sensing [35], to motion monitoring/stabilization in automotive industry and consumer electronics [36, 37]. Current techniques are based upon micro-/nano-electromechanical systems (MEMS/NEMS) which, however, suffer from a tradeoff between sensing resolution, detection sensitivity and operation bandwidth, primarily resulting from the fundamental mechanical and electrical thermal fluctuations [38-43]. Suppression of these noise sources may need sophisticated electronics and a cryogenic environment [44-51]. Electromechanical control of microcavities have been shown previously in one-dimensional zipper and double-membrane cavities [24, 25, 26]. These approaches, however, were either limited by low tuning speed, high leakage currents, or the use of low-Q cavities, which prohibited the observation of radiation back-action effects.

SUMMARY

According to a first aspect, a system is described comprising: a first photonic crystal (PC) having an inner edge and an outer edge, the first PC comprising a plurality of holes; a second PC having an inner edge and an outer edge, the second PC comprising a plurality of holes, the inner edge of the second PC being adjacent to the inner edge of the second PC; a waveguide section and/or a wave trap section formed between the first PC and the second PC, wherein the wave trap section is configured to trap an electromagnetic wave within a cavity; and a first pair of capacitively coupled metal contacts located outside an optical mode volume of the first PC, the first pair of capacitively coupled metal contacts comprising a first metal contact and a second metal contact, the second metal contact contacting the outer edge of the first PC, wherein a first electrical voltage is adapted to be applied across the first pair of metal contacts, and wherein the first PC is adapted to move as a function of the first electrical voltage and/or the electromagnetic wave such that the waveguide section and/or the wave trap section contracts and/or expands.

According to a second aspect, a method is described comprising: propagating an electromagnetic wave through a waveguide section formed between a first photonic crystal (PC) and a second PC; trapping the electromagnetic wave within a wave trap section formed between the first PC and the second PC, thereby causing the waveguide and the wave trap section to contract or expand; and applying a first electrical voltage across a first pair of capacitively coupled metal contacts, the first pair of capacitively coupled metal contacts comprising a first metal contact and a second metal contact, wherein the applying the first electrical voltage causes the waveguide section and the wave trap section between the first PC and the second PC to expand or contract.

According to a third aspect, a method of changing an optical resonance frequency is described comprising: applying an electrical voltage across a first pair of capacitively coupled metal contacts comprising a first metal contact and a second metal contact, the second metal contact contacting an outer edge of a first photonic crystal (PC); changing position of the first PC as a function of the applied electrical voltage across the first pair of metal contact, thus causing a waveguide section and a wave trap section between the first PC and the second PC to expand or contract; and shining light to the waveguide section and the wave trap section.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 24-25 show force (FIG. 24) and acceleration (FIG. 25) sensing resolution as a function of input power, at three mass levels.

DETAILED DESCRIPTION

Figure 1:
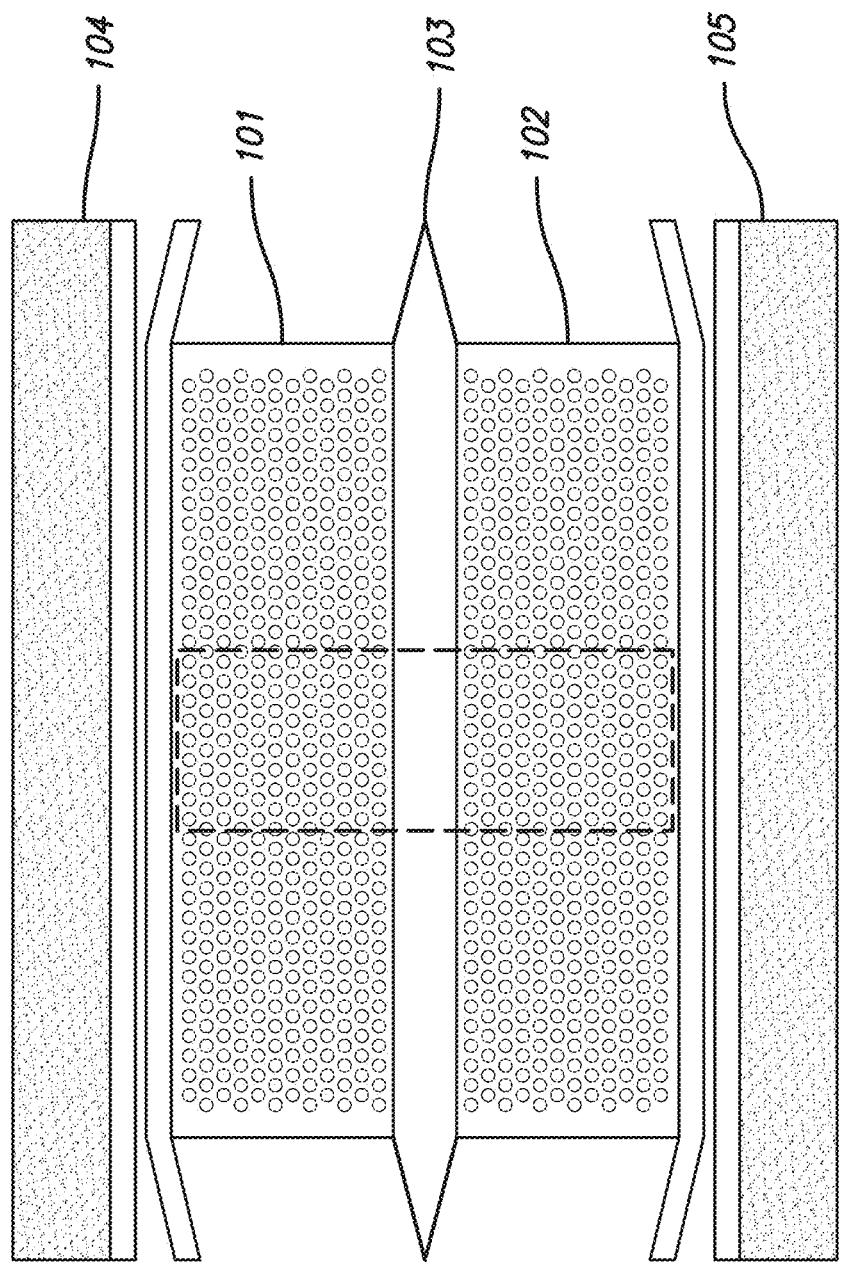
FIG. 1 shows a displacement profile of a photonic crystal (PC) implementation of an electro-optomechanical cavity.

Throughout the present disclosure, embodiments and variations are described for the purpose of illustrating uses and implementations of the inventive concept. The illustrative description should be understood as presenting examples of the inventive concept, rather than as limiting the scope of the concept as disclosed herein.

In the present disclosure, the term "radiation pressure back-action" can be defined as a process whereby an interaction with the electromagnetic field modifies the properties of a mechanical element, including but not limited to, a spring constant K, or an effective temperature.

In the present disclosure, the term "shot-noise limited read-out" can be defined as a measurement of an object where the sum of all other noise sources is no larger than the noise due to intrinsic quantum noise of the light field used to perform the measurement. This quantum noise is referred to as the 'shot-noise' of the light field.

In the present disclosure, the terms "cavity" or "nano-cavity" can be defined as a structure that is designed to trap light or an opening where an electromagnetic wave (e.g., light wave) can propagate in or through. The example embodiments presented in the present disclosure are that of a photonic crystal with a periodic array of holes that in one area of the structure has modified hole size and/or hole separation to trap light at that location with little loss.

In the present disclosure, the term "resonant transmission spectroscopy" is the method whereby a laser which is at the same (or similar) frequency as an optical mode is transmitted through the optical mode and detected.

In the present disclosure, a near-field optical coupling technique is a method where a structure that supports a traveling optical wave (e.g., an optical waveguide) is placed near a structure which contains a localized optical resonance that the fields of the localized and traveling wave modes overlap, thus allowing light to enter into the cavity from the waveguide.

In the present disclosure, a tapered optical fiber can be an optical fiber that has been heated and stretched such that over a narrow region of its length, the fiber becomes thin enough that light fields traveling through the fiber leak out and are able to couple to external systems (e.g., cavities, resonances, other waveguides, etc.). A dimpled tapered optical fiber can be for example a tapered optical fiber that has been further processed to have a small 'U' shape in the fiber, so that it is easier to couple to in-plane optical devices.

In the present disclosure, the term "waveguide" intends to refer to a structure that guides an electromagnetic wave. The term "wave trap" intends to refer to a structure that confines an electromagnetic wave.

The force associated with the radiation pressure [1] which is a manifestation of the mechanical momentum carried by all electromagnetic waves, can be used in manipulating and detecting the motion of micro and nanomechanical objects embedded within a resonant cavity [2, 3, 4].

The simplest form of a cavity-mechanical system may consist of a resonant electromagnetic cavity with its resonance frequency dispersively coupled to the position of a mechanical object. In such a cavity-based scheme, a narrow-band electromagnetic source can be used to pump the cavity. Mechanical motion may translate into modulation in the stored intra-cavity electromagnetic field, and through the filtering properties of the cavity, results in an imprinting of the mechanical motion on the electromagnetic signal. The resonant enhancement of the pump's radiation pressure can result in back-action effects which can further modify the dynamic mechanical and optical properties of the coupled system. The back action effect can be considered strong when the modifications of the temperature or the spring constant (where $\Delta X$ is the change in the value of the parameter of interest, in this case temperature and/or spring constant) are large compared to the intrinsic value (where the unmodified or intrinsic value of the parameter (temperature and/or the spring constant) is X), more precisely, when $\Delta X/X > 1$. Dynamical back-action effects can include optical stiffening of the mechanical structure [4, 5, 6, 7, 8], damping or amplification of the mechanical motion [6, 9, 10, 11], or electromagnetically induced transparency [12, 13, 14].

Cavity-mechanical systems demonstrating near quantum-limited position read-out and strong radiation pressure back-action can be realized both in the optical [15, 16] and the microwave frequency domains [17, 18]. The force/acceleration read-out can be inferred from the position read-out via calibration. The optical domain has the advantage of shot-noise limited read-out (even at room temperature) and large radiation pressure coupling due to the relatively large operating frequency, whereas the microwave domain has the benefit of simple electrical interfacing and compact, robust packaging. A chip-scale platform can be used for integrating cavity-optomechanics with conventional micro-electromechanical systems (MEMS) in which the mechanical degree of freedom can be strongly coupled via radiation pressure to both an electrical circuit as well as a high-Q optical cavity [19]. Using an integrated photonic crystal device, the wide-band (e.g., ~19 nm) electromechanical tuning of the optical cavity resonance, near shot-noise-limited optical read-out of mechanical motion, and electromechanical locking of the optical cavity to a fixed laser source can be exhibited. By combining these device attributes, a series of key optomechanical back-action effects can also be realized, including optical stiffening, back-action cooling, and phonon lasing. The coupled electro- and optomechanical systems driven by radiation pressure and packaged in a chip-scale form factor may be used to create sensors of electrical [20], force [15, 17], acceleration, or mass [21] operating at the quantum limits of sensitivity and bandwidth. In the present disclosure, a platform for cavity electro- and optomechanics is developed, in which both electrical and optical signals are coupled to a common mechanical degree of freedom [19]. Planar photonic crystals (PCs) can be used, since they provide the potential for on-chip integration with existing microwave and micro-electromechanical systems (MEMS) technologies, and radiation pressure coupling due to their nanoscale optical mode volumes [8, 22, 23].

According to an example embodiment of the present disclosure, FIG. 1 shows an electro and opto-mechanical system comprising a first photonic crystal (PC) (101), a second photonic crystal (PC) (102) and a slot (103) between the first PC (101) and the second PC (102). The first PC (101) and the second PC (102) can comprise an inner edge and an outer edge, where a slot (103) is formed between the inner edge of the first PC (101) and the inner edge of the second PC (102). The first PC (101) and the second PC (102) may comprise of numbers of holes.

The slot (103) can be divided into two sections namely a waveguide section and a wave trap section. The location of the waveguide and the wave trap sections in the slot between two PCs can be varied depending on the arrangement of the periodic array of holes. In the example embodiment of FIG. 1, the wave trap section is the central region of the slot between the two waveguide sections which is designed to trap an electromagnetic wave within the slot (103) cavity. The slot (103) can be a space created between two PCs (101, 102) suspended on flexible struts (see, for example, FIG. 5) in which an optical field can be localized. Sections of the slot (103) that are configured as a wave trap section can be referred to as a cavity.

At least one pair of metal contact or electrostatic actuators can be present in the example embodiments of the present disclosure to provide an electromechanical control of PC motion and the slot width. According to the example embodiment of FIG. 1, the arrangement can comprise two pairs of metal contacts (104 and 105) or electrostatic actuators made of, for example, gold. Each PC can be adjacent to a pair of metal contact. In the example embodiment of FIG. 1, the first pair of metal contacts (104) can be adjacent to the first PC on a side opposite the second PC; and the second pair of contacts (105) can be adjacent to the second PC (102) on a side opposite to first PC (101). The two pairs of metal contacts (104 and 105) can act as capacitive MEMS actuators to provide electromechanical control of PC motion and the slot width. By using two pairs of metal contacts (104 and 105), the tuning range of the cavity resonance of the slot can be improved by a factor of two in comparison to the tuning range using one pair of metal contacts.

In FIG. 1, the slot (103) can be formed as a waveguide defect in between two individual PCs, the distance between which can be adjusted using an electrostatic force generated between pairs of metal wires. A laser source can be used to insert light into the slot (103) between the two PCs (101 and 102). The confined light in the slot (103) region makes the optical mode frequency ($\omega_c$) highly sensitive to the separation s of the two PC with an optomechanical coupling of $g'_{OM} = \partial \omega_c / \partial s = \omega_c / L_{OM}$ (see, for example, FIG. 4). The electrostatic actuators or the pairs of gold contacts (104 and 105) with the underlying silicon can form capacitors (capacitance C) which may create an electrostatic force $F_{el} = (1/2) (dC/dw_g) V_a^2$ when applying a voltage $V_a$ across the capacitor gap $w_g$ [29] (see, for example, FIG. 4). $F_{el}$ leads to contraction of the capacitors, thus increasing s and leading to a blue-shift of the cavity resonances.

In the example embodiment of FIG. 1 which shows an opto-electromechanical system, the optical mode is generally confined to the wave trap section of the slot (103). This separation can help the slot (103) maintain a high optical Q (low-loss) as well as assist in opto-mechanical back-action effects. In FIG. 1, the two pairs of metal contacts (104 and 105) can be located at a distance that is at least greater than an optical mode volume away from the slot. In the example embodiment of FIG. 1, the two pairs of metal contacts (104 and 105) or the pairs of gold wires (e.g., tuning capacitors) can be located at a distance that is, for example, a width of the PC from the slot (103). In other words, the first PC (101) provides a separation between the slot (103) and the first pair of metal contacts (104) and the second PC (102) provides a separation between the slot (103) and the second pair of metal contact (105).

The optical mode volume can be defined mathematically as follows:

$$\frac{\int |\vec{E}|^2 \cdot \varepsilon \cdot dVol}{\max(|\vec{E}|^2 \cdot \varepsilon)}$$

Figure 2A:
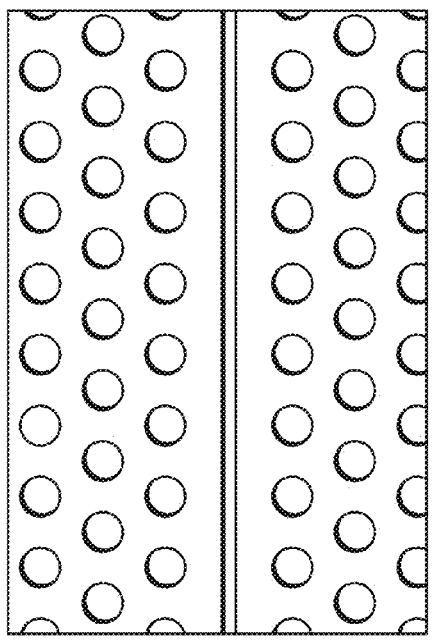
FIG. 2A shows a diagram of a processed photonic crystal (PC) device in a double-capacitor configuration.
Figure 2B:
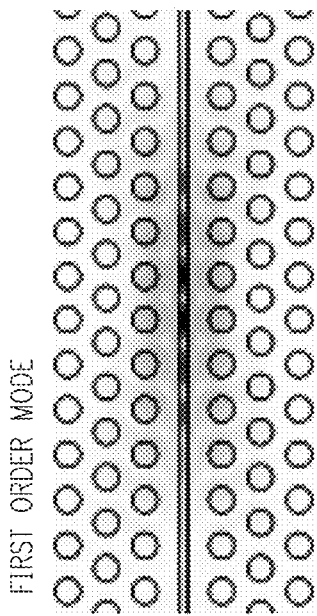
FIGS. 2B and 2C show electric field distribution of the first and second order optical cavity modes.
Figure 2C:
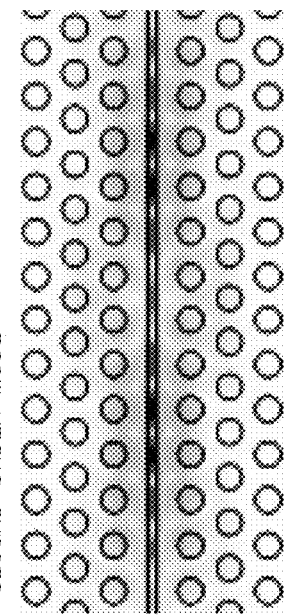

Where, $\vec{E}$ is the electric field of the optical mode and $\varepsilon$ is the electric permittivity, where the integral is taken over an entire volume of system. Qualitatively, the optical mode volume is the region over which the electric field has an appreciable value (where the magnitude of the electric field has not decayed significantly). In the example embodiment of FIG. 1, the modes are tightly confined to the center slot area (see, for example FIGS. 2B and 2C) which can corresponds roughly to the optical mode volume of the embodiment of FIG. 1. The localization of light in the slot (103) can be determined by a two-step compression of the PC lattice constant [27] (e.g. the spacing between the holes) along the length of the slotted PC waveguide formed from the two PC halves (101 and 102) [23]. By way of example and not of limitation, the PC structure of FIG. 1 can be fabricated with a lattice constant of a=470 nm, a relative hole radius of r/a=0.285, and a slot width of s/a=0.21 nm so as to produce optical modes in a wavelength band around 1500 nm with high-Q and large radiation pressure coupling. The confinement of light in the slot (103) makes the optical mode frequency ($\omega_c$) highly sensitive to the separation s (see, for example, FIG. 4) of the two PCs with a theoretical opto-mechanical coupling $g'_{OM} = \partial \omega_c / \partial s = \omega_c / L_{OM} = 2\pi \times 152$ GHz/nm obtained from FEM simulations. In the example embodiment of FIG. 1, the optical cavity (103) can support two high-Q modes (theoretical Q>$10^6$), FEM simulations of which are shown in FIGS. 2B and 2C. The electric field distribution $|E|^2$ of the first and second order optical cavity modes are correspondingly shown in FIGS. 2B and 2C. FIGS. 2B and 2C further show a close up view of the optical region and a simulation of the first order and second order optical field intensities in the slot mode. The frequency of this resonant mode is sensitively coupled to the size of the slot-gap via the $g_{OM}$ parameter. FIG. 1 shows an example of the beams being pulled apart by the capacitive electrodes. This is the mode which most directly changes the slot-gap width and thus which has the largest $g_{OM}$.

Figure 4:
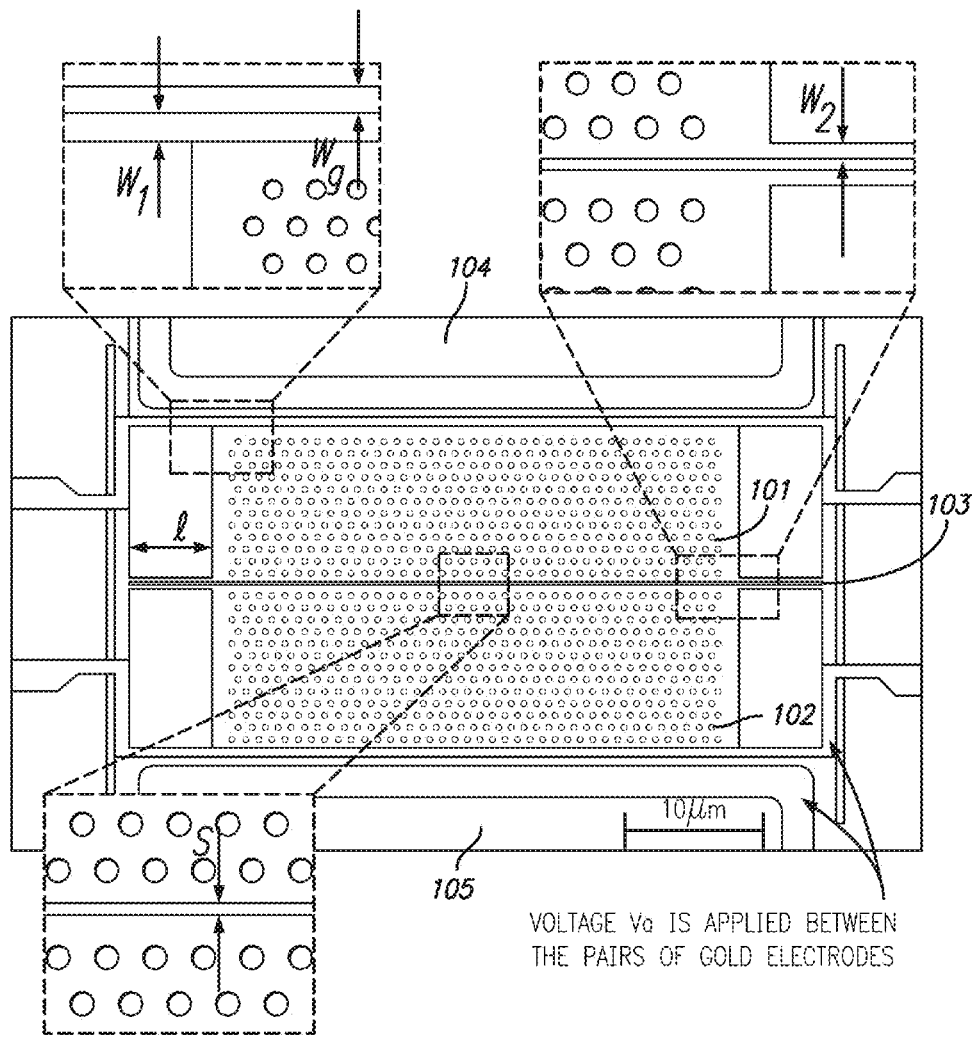
FIG. 4 shows a diagram of a processed photonic crystal (PC) device in a double-capacitor configuration.
Figure 5:
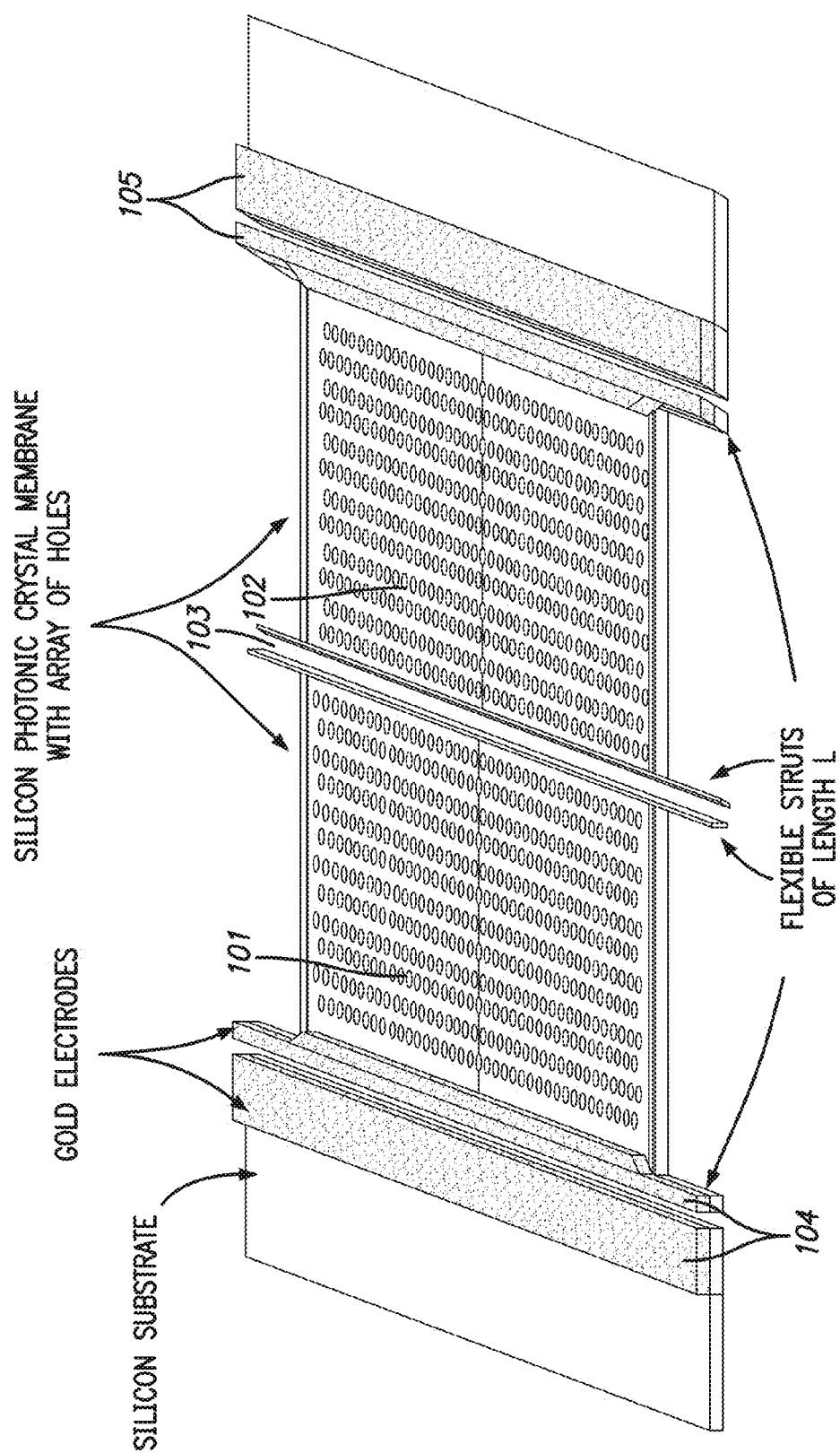
FIG. 5 shows a 3-dimensional view of a processed photonic crystal (PC) device in a double-capacitor configuration.

FIGS. 4 and 5 show a scanning-electron micrograph of a device fabricated on a microelectronics SOI wafer in a double-capacitor configuration. The PCs (101 and 102) can be suspended on l=3 μm long struts of width $w_1$=250 nm and $w_2$=80-150 nm, respectively, yielding estimated effective spring constants for in-plane motion on the order of $k_{eff}$≈50 N/m. For a metal layer thickness of 200 nm and capacitor gaps of $w_g$=200-250 nm, C can be estimated to be ~0.7 fF and $F_{el}$~1.5 nN/V². A light wave has momentum. If the light wave is trapped inside a cavity (in the slot (103)) it can exhibit a force on the PCs across the cavity and if the PCs are light enough, the momentum of light can push the PCs apart from each other (radiation pressure back action). This in turn can tune the resonant frequency of the cavity along with the electrostatic tuning. The back action effect is inversely proportional to the mass of the PCs such that as the mass of the PCs increase, the back action effect is reduced. Therefore, the mass of the PCs is small enough in order to ensure presence of back action effects. In the example embodiment of the structure shown in FIGS. 1, 4 and 5, since the PCs are very light (e.g., 220 nm thick) the cavity resonance of the slot (103) can be tuned efficiently and therefore the bandwidth of the cavity can be changed dynamically over a wider range.

Figure 3:
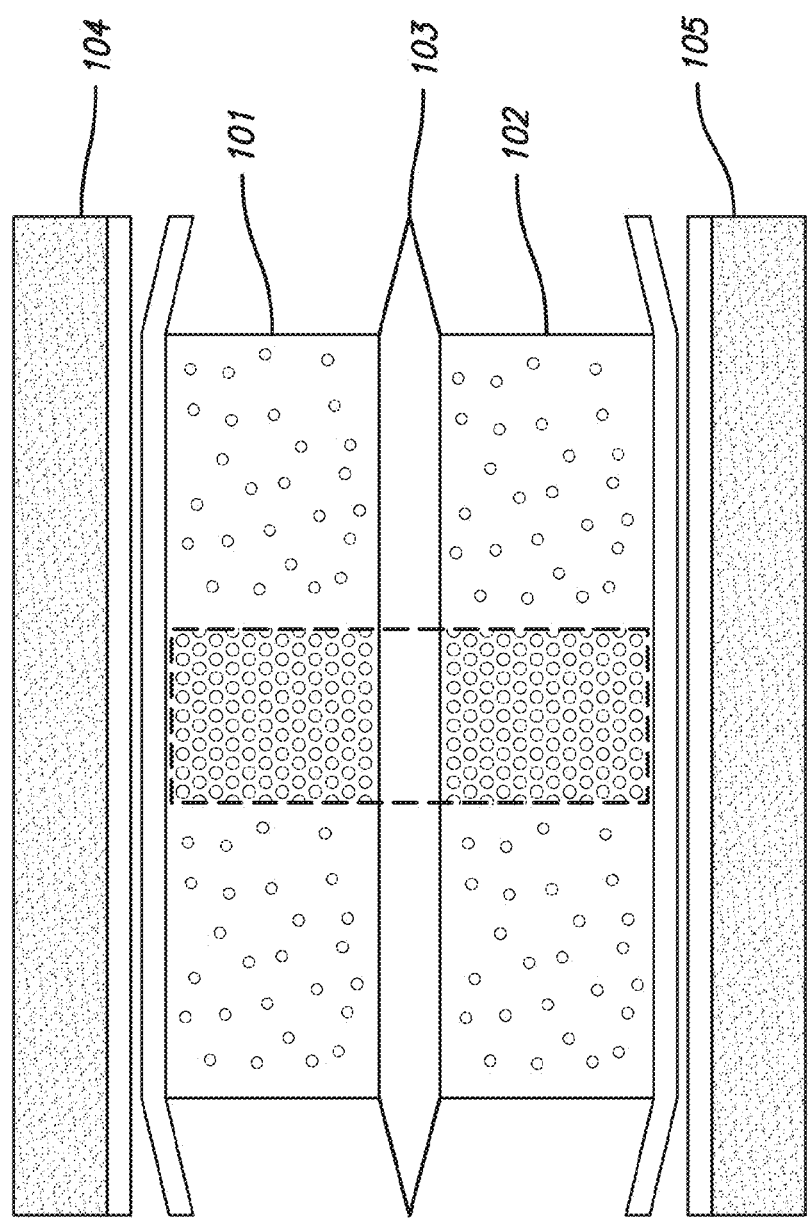
FIG. 3 shows an exaggerated example of decreasing the spacing between holes inside the photonic crystal (PC).

A person skilled in the art would understand that the propagation through the photonic crystal can be modified by creating a periodicity (e.g., arrayed configuration of holes) in the dielectric constant of the material. By engineering the periodicity, light can be guided and/or trapped in the structures and by modifying the periodicity of the holes, size or shape of the holes, the spacing between the holes in certain regions, trapping of the light can be controlled as desired. By way of example and not of limitation, the holes can have the shape of a cylinder, elliptical cylinder, or any other shape that may be known by persons skilled in the art. In the example embodiments of FIGS. 1, 4 and 5 a specific array of holes have been patterned. The holes are equally spaced (e.g., lattice constant of 470 nm) in a triangular lattice and generally have the same size throughout a PC except a specific region near the center of the PC (see, for example, black dashed outline region of FIGS. 1 and 3). In this region the holes are slightly closer together compared to the rest of the PC. FIG. 3 shows a schematic of an exaggerated example of decreasing the spacing between holes along the central region of the two PCs across both sides of the cavity.

With reference back to the example embodiment of FIG. 1, the holes outside the center region, shown as a rectangle with dashed black lines, are uniformly spaced in a triangular array which prohibits a light ray of a certain wavelength range from existing in that region of the photonic crystal (PC) due to destructive interference. However, in the center region of the photonic crystal (PC), the spacing between the holes is changed. In the center region, the spacing between the holes can be gradually decreased from, e.g., 470 nm (the spacing between the holes outside the central region) to 450 nm, which helps a certain wavelength of light to exist in the center region (but not outside it) and creates the optical cavity in the slot region (103). The size of the holes in the PCs does not change in this specific configuration, but similar optical cavities can be created by varying both the lattice constant and the hole size and hole shape. As shown in FIG. 2 the optical mode is mostly confined to the slot between the two PCs [23, 27]. By changing the slot size between the two PCs (101 and 102) with the help of tuning capacitors (104 and 105), the energy (and thereby wavelength) of the optical resonance can be changed. This characteristic of the cavity (103) can make near quantum-limited position read-out accessible with a fixed laser source as opposed to an expensive tunable laser by tuning the optical cavity resonance of the slot (103). In the cavity opto-electromechanical system shown in FIG. 1, the tuning can be achieved by applying a voltage across the pair of metal wires (104 and 105).

With reference to the example embodiment of FIGS. 1 and 4 and 5, the system can be fabricated from silicon-on-insulator material from SOITEC. A lift-off mask for the metal contacts is defined by electron-beam lithography in ZEP-520A positive e-beam resist. A 5 nm/200 nm thick Cr/Au layer can be deposited in an electron-beam evaporator and the resist can be striped with the excess metal on top in Microposit 1165 photoresist remover. Then a fresh layer of ZEP-520A can be applied, and the etch-pattern for the PC structures, together with the necessary cut-outs for capacitor gaps, photonic crystal (PC) suspensions, and strain-relief slices was exposed. The pattern can then be transferred into the silicon by a radio-frequency plasma of $C_4F_8/SF_6$ chemistry. The excess e-beam resist can be removed by cascaded immersion into trichloroethylene, Microposit 1165 remover, and a 10 min etch in Piranha solution (3:1 $H_2SO_4$:$H_2O_2$) at 120° C. The PCs can then be released from the underlying $SiO_2$ layer by immersion into 48% Hydrofluoric acid. Cleaning of the sample surface can then be finalized by an additional Piranha cleaning step, followed by a rinse in de-ionized water and a 1 min immersion into 1:10 HF:$H_2O$. Finally, samples can be glued to a copper sample holder using GE varnish and electrically contacted with gold wires by ultrasonic wire-bonding.

Figure 6:
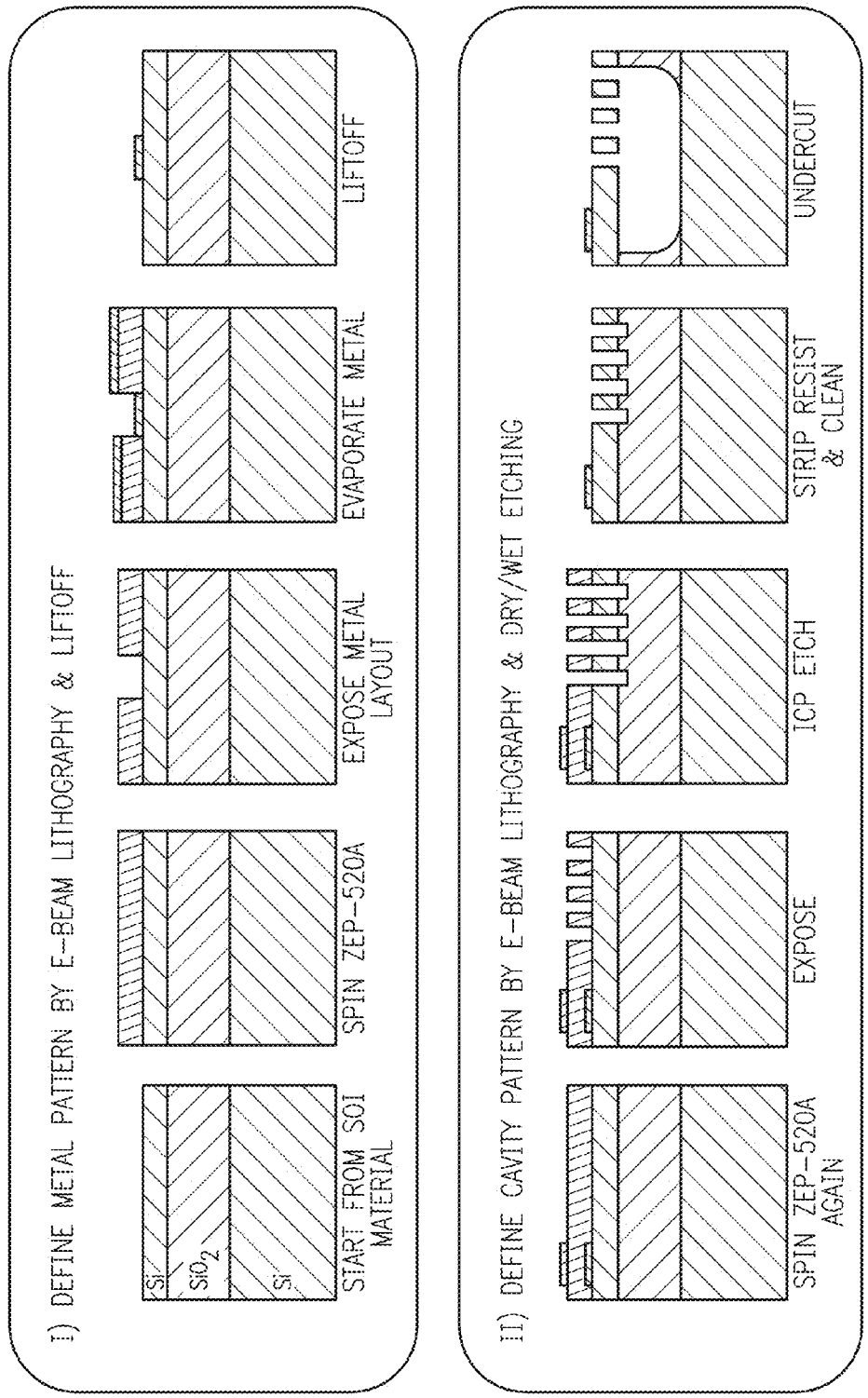
FIG. 6 shows the fabrication process of an electro-optomechanical device.

By way of example and not of limitation, FIG. 6 shows a step by step process of an exemplary fabrication process of an electro-optomechanical device. In the example embodiments of FIG. 6, all the structures are defined from thin layers of dielectric material that allows low-loss transmission of the same wavelength of infrared light that may be found in telecommunications applications (1500 nm wavelength). The patterns are defined in these thin material layers by the exposure of a suitable resist material with an electron beam gun. By a similar process, a person skilled in the art can deposit a metal layer pattern on top beforehand. Further details of the fabrication methods can be found, for example, in Scherer et al, (U.S. Pat. No. 6,468,823) and Joannopolous et. al. (U.S. Pat. No. 6,058,127), both of which are incorporated by reference in their entirety.

Figure 7:
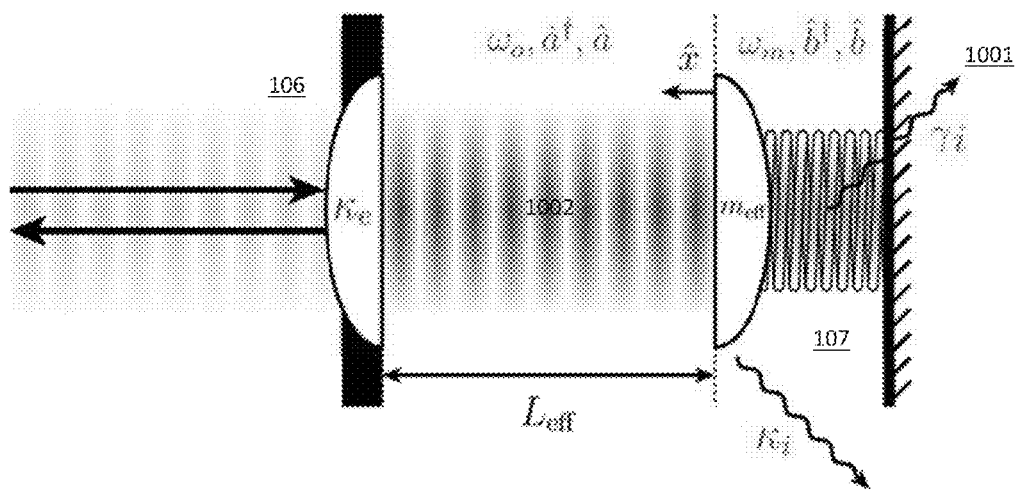
FIG. 7 shows a Fabry-Perot optical resonator comprising of two mirrors, one of which is free to move.

FIG. 7 shows an example embodiment of a canonical optomechanical system of a Fabry-Perot optical resonator which comprises two mirrors (106 and 107) one of which is free to move. In FIG. 7, a laser light (e.g., blue field laser) is incident on a first semi-transparent mirror (106) and enters the optical cavity. There, the photons that compose the light field bounce around many times before either being reflected back out the entry mirror (at a rate $\kappa_c$) or being lost to the environment through absorption or scattering (at rate $\kappa_i$). According to the separation distance (cavity length) of the mirrors, the photons can have certain wavelengths, and accordingly, the resonant frequency inside the cavity (112) varies as a function of the cavity length L. Thus, if the flexible mirror (107) moves, it changes the cavity length L and thus the cavity resonance frequency. The amount by which a displacement changes the cavity frequency is given by the parameter $g_{OM}$ which has units of Hz/meter. If a laser of the resonant wavelength is incident on the cavity, there will be some number (N) of photons inside the cavity. If the mirror (107) moves, the laser will no longer be resonant with the cavity and thus there will be fewer photons in the cavity. Now, each of these photons can also impart a small force on the mirror each time they bounce off of it of magnitude $F=(h/2*pi)*g_{OM}$ where h is Planck's constant. This force is very small, but for large $g_{OM}$ and very small masses, it can be enough to start to push back on the moveable mirror (107). Thus, there can be interactions between the mechanical mode (1001) and optical mode (1002) because motion of the spring changes the number of photons inside the cavity, and the number of photons can change the amount of energy in the spring.

With reference to FIGS. 1, 4 and 5 the characteristics of a photonic crystal (PC) cavity can be explored optically by resonant transmission spectroscopy using a near-field optical coupling technique based on a dimpled tapered optical fiber, the evanescent field of which can be brought into optical contact with the cavity [30]. A swept-wavelength narrow-band telecommunications test laser can be used for obtaining transmission spectra of the optical properties of the device under test.

Figure 8A:
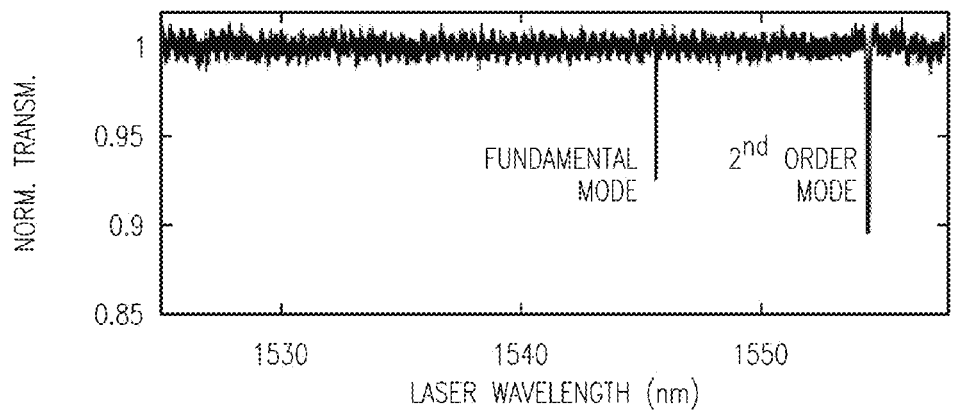
FIGS. 8A and 8B show plots of the normalized transmission spectrum of a device with zero applied voltage showing both the fundamental and the second-order optical resonance (FIG. 8A) and cavity resonance wavelengths (FIG. 8A) versus applied voltage indicating quadratic wavelength tuning of the cavity modes (FIG. 8B).
Figure 8B:
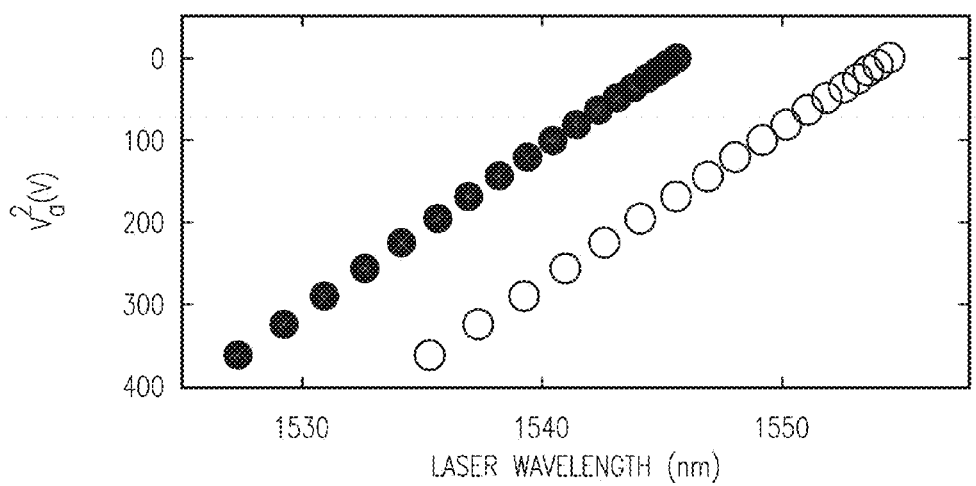

FIG. 8A shows the transmission spectrum of a PC cavity optomechanical device with $w_2$=150 nm and zero applied voltage showing both the fundamental and the second-order optical resonance. The two resonances at 1545.63 nm and 1554.45 nm correspond to the cavity modes depicted in FIGS. 2B and 2C, respectively. If the applied voltage $V_a$ is increased, these resonances blue-shift, which can be seen in the FIG. 8B. For a maximum applied voltage of $V_a$=19 V the fundamental (second order) mode reaches a total shift of −18.3 nm (−19.1 nm) or +2.32 THz (+2.4 THz) without a noticeable reduction of the optical Q-factor. Accordingly, cavity tuning may follow a quadratic voltage dependence. Defining the tunability a by $\Delta\lambda_c = \alpha \cdot V_a^2$, this corresponds to a measured $\alpha$=0.051 nm/V$^2$, in correspondence with the FEM electromechanical simulations of the structure. For devices with $w_2$=80 nm, a person skilled in the art can be able to achieve tunabilities up to $\alpha$=0.088 nm/V$^2$. The accessible tuning range of a given device can be limited by electrical arching between the contacts, which occurs around $V_{max}\approx$20 V in a Nitrogen atmosphere at ambient pressure. Also, due to the large parallel resistance in excess of 400 GΩ, current flow in these structures is negligible, minimizing heating, allowing for ultralow power operation, and very fast tuning bandwidths (>MHz). This parallel resistance is provided by the deep isolation trenches etched into the silicon dioxide layer between the metal contacts See for example FIG. 4B). Without these isolation trenches the tuning period of such devices is on the order of seconds [24]. Viewed as a wide-range (>2 THz) tunable optical filter (bandwidth~1 GHz) operating in the telecom C-band, or as a narrowband modulator/switch with ultra-low switching voltage ($V_\pi$=10 mV at a bias voltage of $V_a$=10 V), the present device performance is improved due in large part to the strong opto-mechanical coupling.

With reference to FIGS. 1, 4 and 5, in addition to the optical properties of the PC slot, the mechanical mode structure of the presented system can be investigated by monitoring the radio-frequency (RF) power spectral density (PSD) of laser light transmitted through a cavity mode. To this end, a tunable external cavity diode laser can be launched into the fundamental or second order cavity mode, and actively stabilize the cavity frequency to a detuning of half an optical linewidth from the laser. Then the transmitted pump light can be detected on a high-speed photo-detector (125 MHz bandwidth), and the fluctuation power spectral density of the photocurrent can be computed with a high-speed digitizing oscilloscope.

Figure 9:
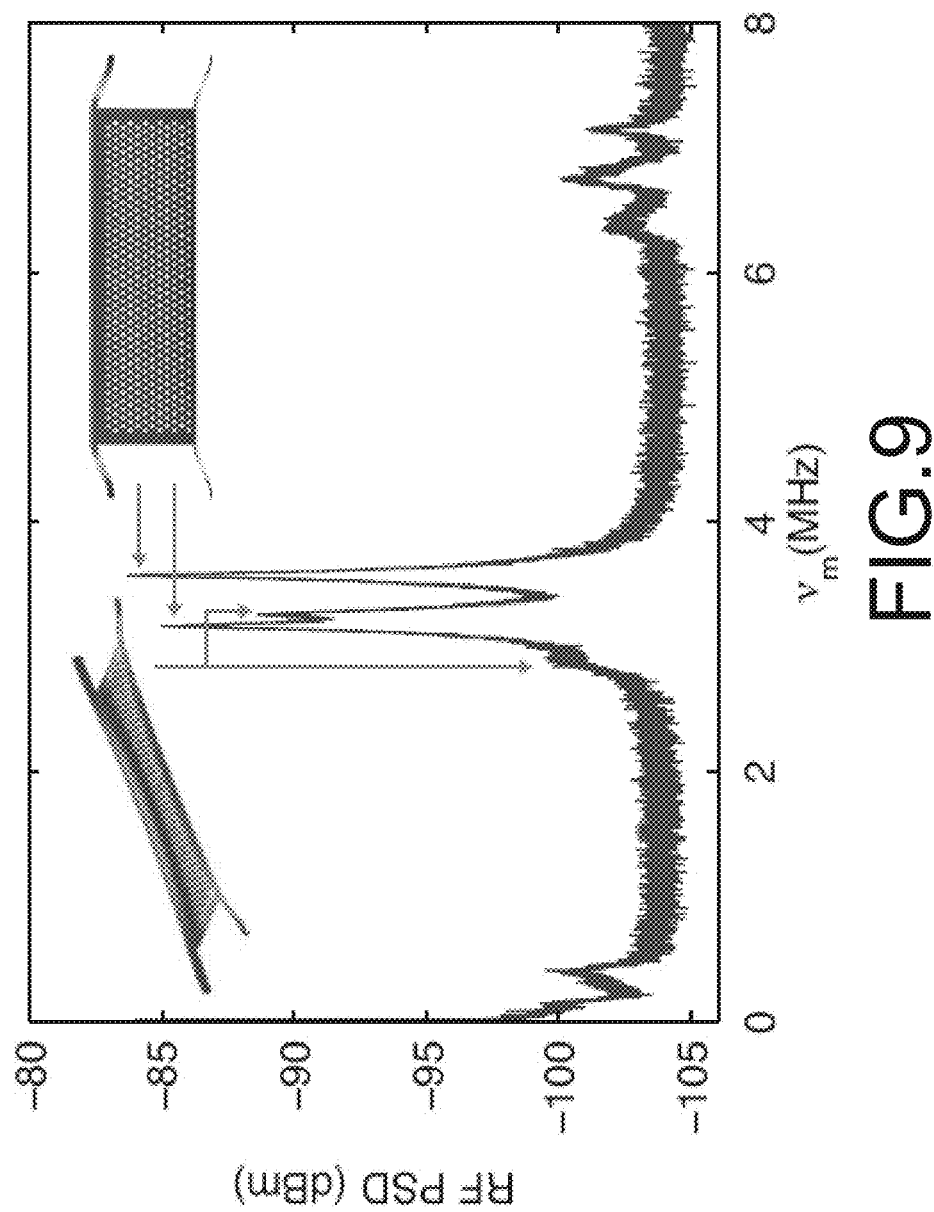
FIG. 9 shows RF power spectra density (PSD) of laser light transmitted through the second order cavity mode.

FIG. 9 shows the RF power spectral density of laser light transmitted through the second order cavity mode. The resonances at 3.18, 3.28, and 3.61 MHz correspond to modes with hybridized in and out-of-plane character. The insets show FEM-simulations of the eigenmodes of a single PC half in top- and sideview. In FIG. 9, this is shown for transmission of a probe laser through the second order cavity mode. The strongly transduced resonant features between 3 MHz and 3.6 MHz correspond to mechanical modes of the structure that originate from the in-plane tuning mode (right inset in FIG. 9) of the two individual PCs, split by fabrication asymmetries. Moreover, hybridization with a near-resonant out-of-plane (flexural) mode (see left inset in FIG. 9) that originates from the breaking of out-of-plane symmetry induced by the presence of the top metal contacts gives rise to the additional features at 2.9 and 3.15 MHz. The mechanical modes shown in FIG. 9 can also be resonantly addressed by driving the actuators with a sinusoidal modulation voltage. The Q-factors of the mechanical modes of the current embodiment of FIGS. 1, 4 and 5 were found to be in the range 50-100, limited by air-damping [8], thus allowing for high-speed tuning of the structure at rates limited by the mechanical time-constant of 20 µs.

Figure 10:
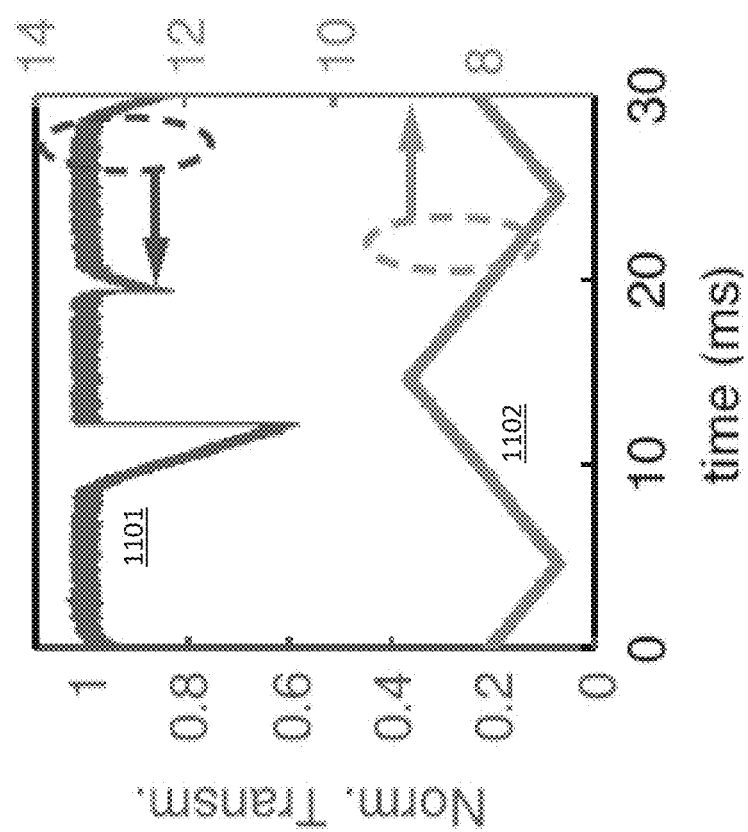
FIG. 10 shows transmission spectrum of a second order cavity mode.

Despite the benefits for the readout and manipulation of micromechanical motion, optomechanical back-action has hitherto not found technological application in large part due to the need for elaborate tunable laser-sources to control the relative cavity-pump laser detuning. In the presented system, however, frequency tunability is solely afforded by electromechanical actuation, thus allowing for the study of optomechanical effects using simple fixed-frequency laser sources. As an example of this, FIG. 10 shows an oscilloscope trace of the transmission of a strong pump laser ($P_i$=270 µW) through the second order cavity mode (1101) while applying a 50 Hz triangular wave to the actuators (1102). Both the triangular shape of the transmission curve and the asymmetry between forward- and backward scans arise from the well-known thermal bistability of silicon microcavities [31]. The cavity to a fixed-frequency pump laser can be actively locked by using electromechanical frequency tuning. Accordingly, an active control of the cavity electrical contacts can be achieved with a commercial PI-control loop. Therefore, the error signal obtained from the transmission level of the pump laser is proportional to the intracavity photon number $n_{cav}$. Additionally, although not performed here, using a feedback loop of sufficient bandwidth allows for active feedback cooling ("cold-damping") and amplification of the mechanical mode [32, 19].

Figure 11:
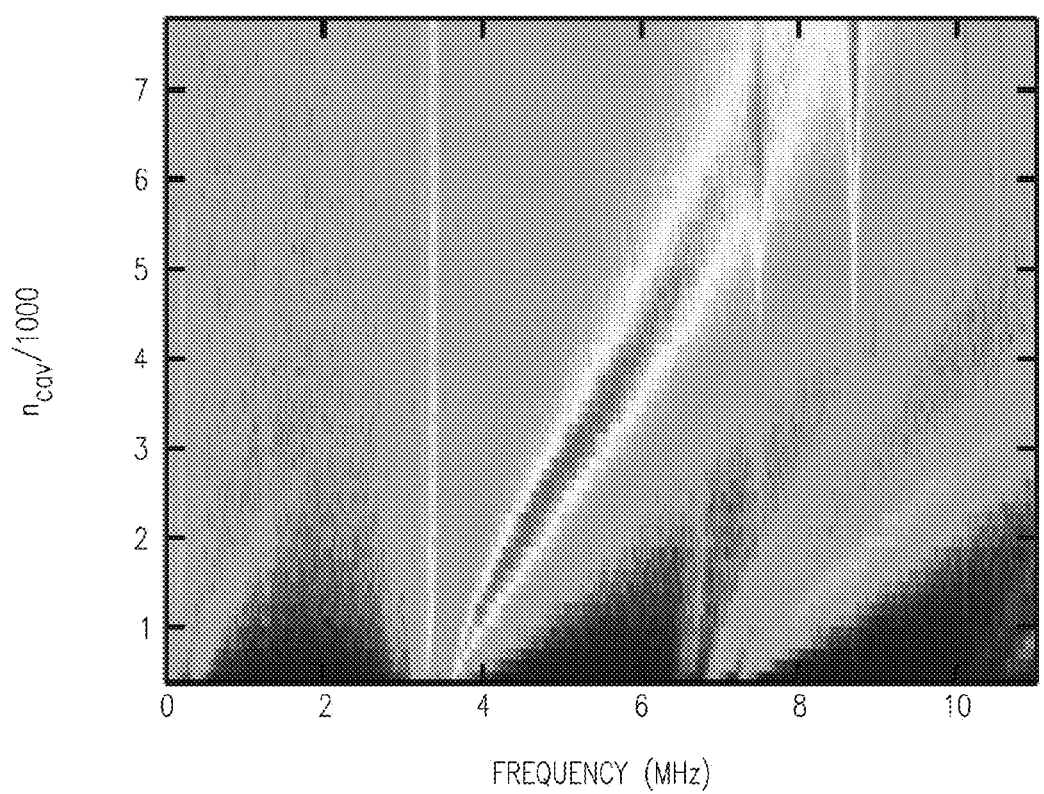
FIG. 11 shows RF spectra of the pump laser transmission as function of the intracavity photon number $n_{cav}$.

As an example of electrically controlled optomechanical back-action, the study of the optical spring effect by tuning the cavity in resonance with the blue-detuned pump laser can be useful. FIG. 11 shows a series of RF-modulation spectra while changing the intracavity photon number $n_{cav}$ in the second order cavity mode. This can be achieved by actively locking the tunable cavity to different levels of the pump laser transmission as described above. The higher frequency mode initially at 3.61 MHz can be renormalized by the radiation pressure coupling to the internal cavity field into the in-plane differential mode of FIG. 1, and shifts to ≈8 MHz for $n_{cav}$=7500 (To be noted that the lower frequency mode at 3.3 MHz shifts very little, as it is renormalized to the uncoupled common mode of motion between the PC halves). The observed frequency shift is consistent with $g_{OM}$=2π×215 GHz/nm, in reasonable agreement with the theoretically expected value.

Figure 12:
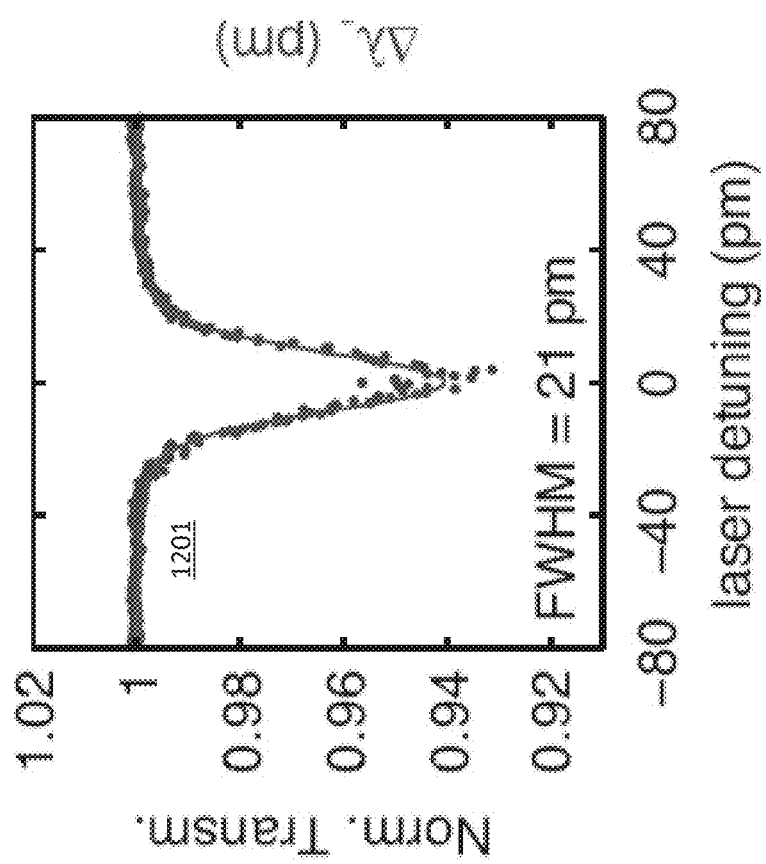
FIG. 12 shows normalized transmission spectrum of the fundamental cavity mode of a device.

The optical spring effect can be useful since it only affects the dynamic spring constant of the mechanical system responding to fluctuations around mechanical equilibrium, but leaves alone the static stiffness of the structure [7]. Increasing the wide-range tunability of a micromechanical device by reducing the spring constant $k_{eff}=m_{eff}\omega_m^2$ naturally leads to a compromise in which the noise is increased due to thermal processes. The frequency jitter of the cavity resonance in the highly flexible structures of the embodiment of FIGS. 1, 4 and 5 can be estimated to be $\Delta\lambda_{rms}=(\lambda_c/L_{OM})\sqrt{k_BT/m_{eff}\omega_m^2}$=18.1 pm, which is comparable to the entire measured optical linewidth of 22 pm. As a result, time-averaged transmission scans such as the fundamental optical cavity resonance shown in FIG. 12 are predominantly thermally broadened. The line (1201) in FIG. 12 shows a fit assuming a Voigt line profile that allows us to estimate an intrinsic linewidth of 6-9 pm with thermal Gaussian line broadening of ≈18 pm. Using optomechanical back-action this thermal noise can be overcome, without sacrifice in tunability, by increasing $k_{eff}$ using the optical spring effect.

Figure 13:
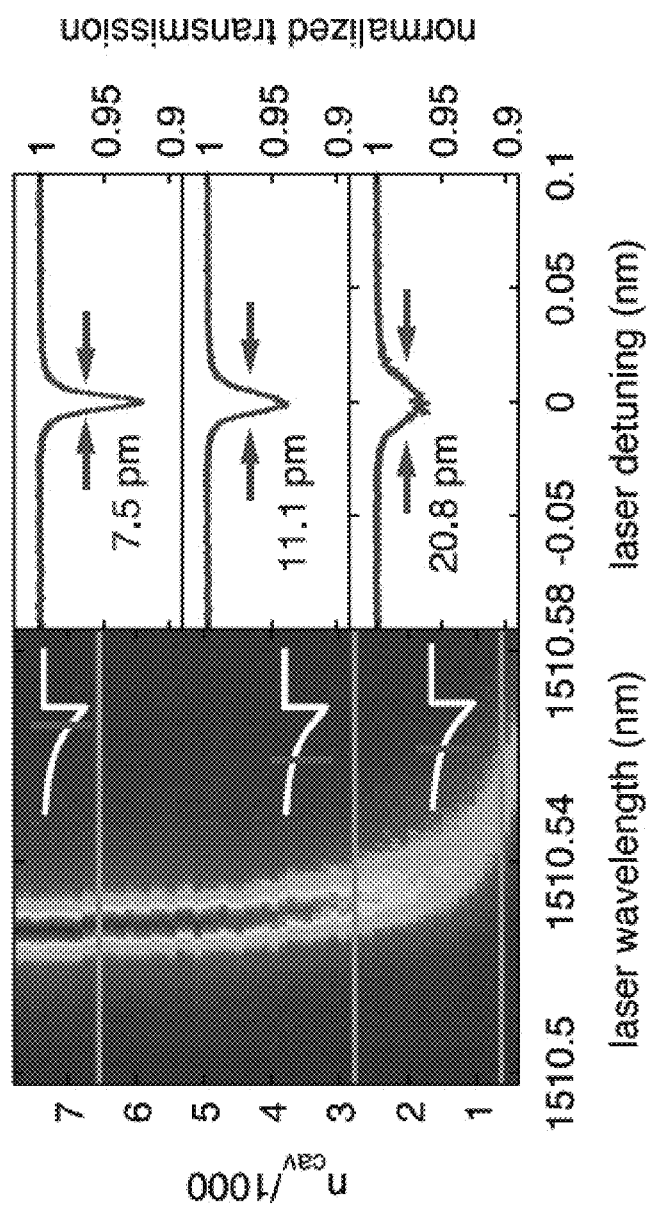
FIG. 13 shows plots of the transmission scans of the fundamental cavity mode as function of the intracavity photon number $n_{cav}$ in the second order mode. The horizontal lines indicate the intra-cavity photon numbers at which the individual scans in FIG. 13 (upper, middle and lower panel) was taken.
Figure 14:
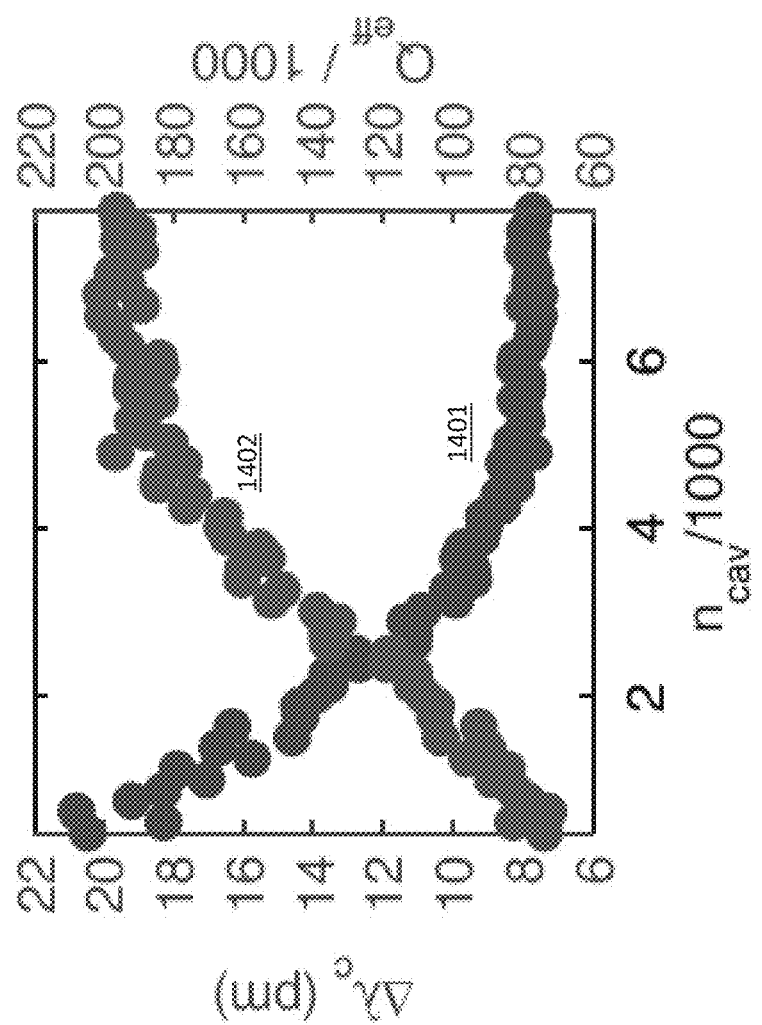
FIG. 14 shows linewidth of the fundamental cavity mode as function of $n_{cav}$ in the second order mode.

In order to investigate the effect of the reduction of thermal PC motion by increasing $k_{eff}$ via the optomechanical spring effect, the transmission spectra of the fundamental cavity mode as function of $n_{cav}$ stored in the second order (pump) cavity mode can be monitored. To this end two separate telecom external-cavity diode lasers that are combined via a fiber-based optical beamsplitter before entering the fiber taper and that are individually detected after being separated by a fiber-based transmission/reflection bandpass filter at the taper output can be used. One laser (pump laser) is kept at a fixed wavelength close to the second order optical cavity mode. Again, the detuning with the pump laser can then be controlled electrostatically. At the same time, the second laser can be swept across the fundamental mode, resulting in the transmission spectra shown in FIG. 13 for various values of $n_{cav}$. As $n_{cav}$ increases, the cavity modes red-shift due to heating of the structure, which counter-acts the electrostatically induced blue-shift and results in the saturation of cavity tuning. At the same time, the linewidth of the fundamental cavity mode decreases significantly, as can be seen from the cuts through the upper, middle and lower panel of FIG. 13. The linewidths $\Delta\lambda_c$ extracted from the transmission curves are shown as the bullets (1401) in FIG. 14, while the bullets (1402) express the width as an effective Q-factor $Q_{eff}=\lambda_c/\Delta\lambda_c$. While the initial linewidth is 21 pm, for $n_{cav}=7500$ it can be observed that narrowing to 8 pm, corresponding to an intrinsic optical Q-factor of 200000. This is more consistent with the observed cavity linewidths of ≈3 pm ($Q \approx 5 \cdot 10^5$) on nominally identical, mechanically rigid test cavities.

Figure 15:
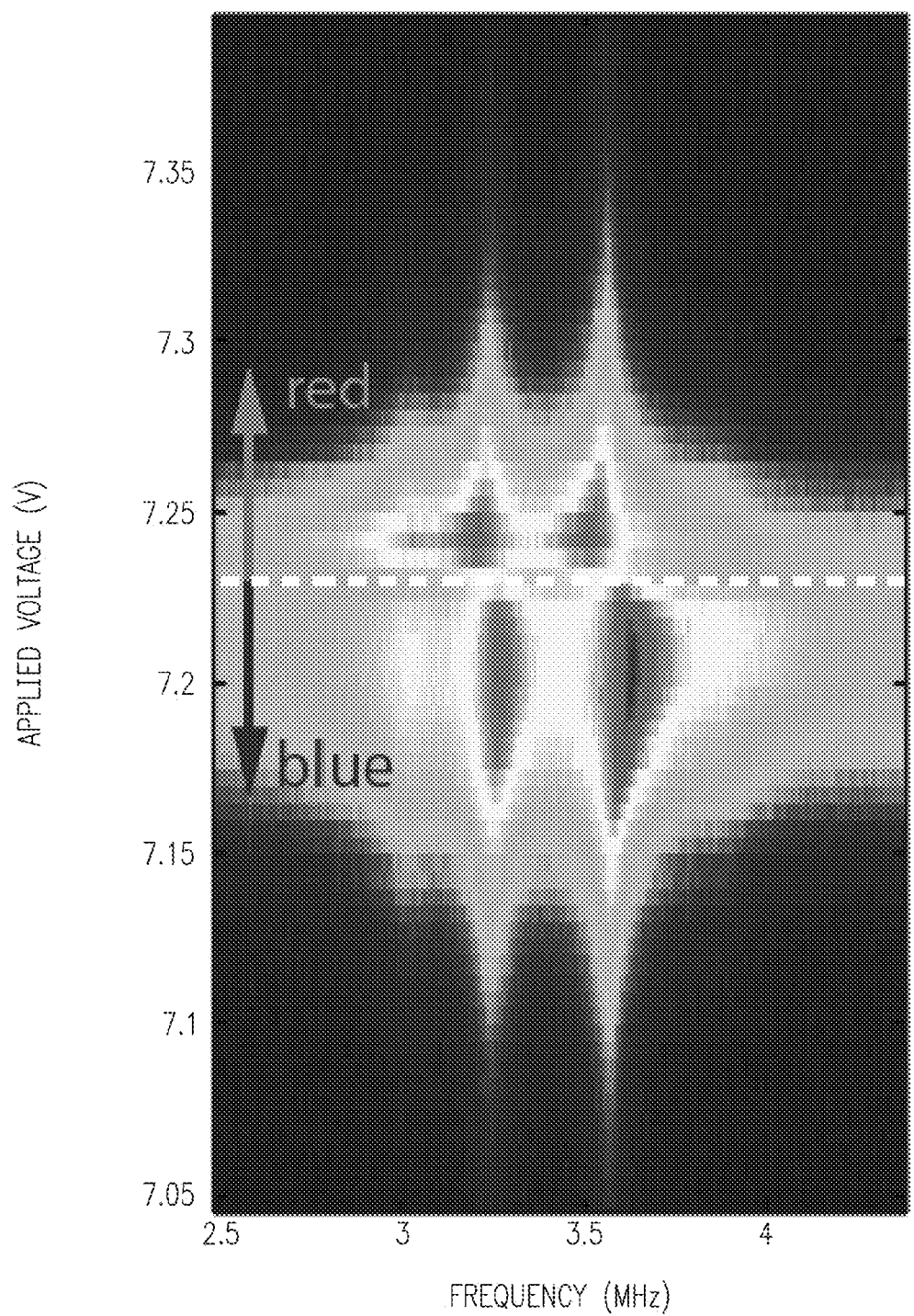
FIG. 15 shows plot of RF optical transmission spectra as a function of $V_a$.

Using electromechanical control of the cavity frequency, parametric amplification (phonon lasing) and back-action cooling can also be realized. FIG. 15 shows mechanical spectra of an example device similar in operating principle but slightly different in specification from the device of FIG. 1, while sweeping the fundamental cavity mode across resonance with a pump laser with $P_i=25$ µW. For a blue-detuned pump laser ($V_a<7.23$ V) it can be observed that there will be stiffening of the mechanical modes (similar to FIG. 14) while for red detuning there will be softening, indicated by a reduction of the mechanical mode frequencies. In the electro-optomechanical PC cavity, one can switch between the two regimes by using a fixed-frequency pump and simply changing a voltage.

Figure 16:
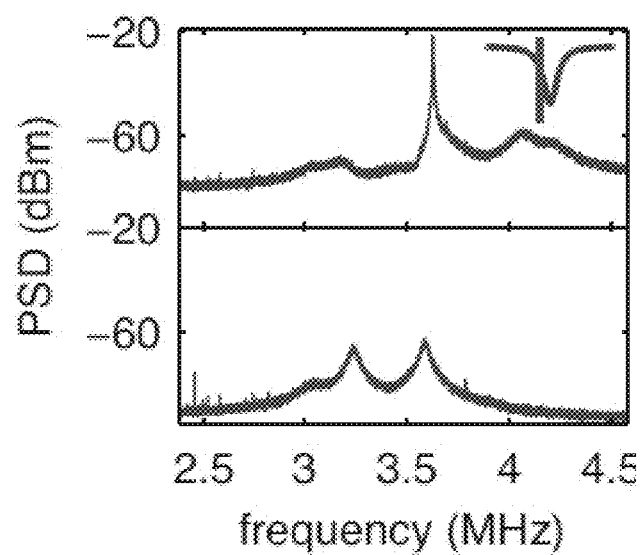
FIG. 16 shows RF spectra for a blue-detuned pump laser below (lower panel) and above the lasing threshold (upper panel).
Figure 17:
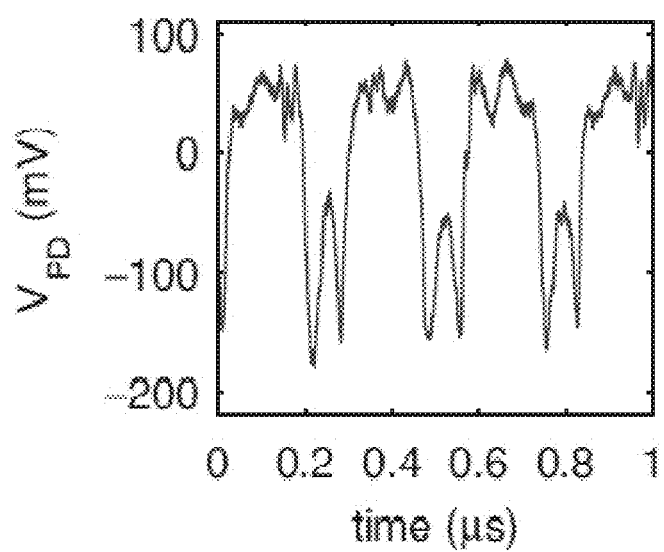
FIG. 17 shows time trace of the cavity optical transmission in the phonon lasing regime.
Figure 18:
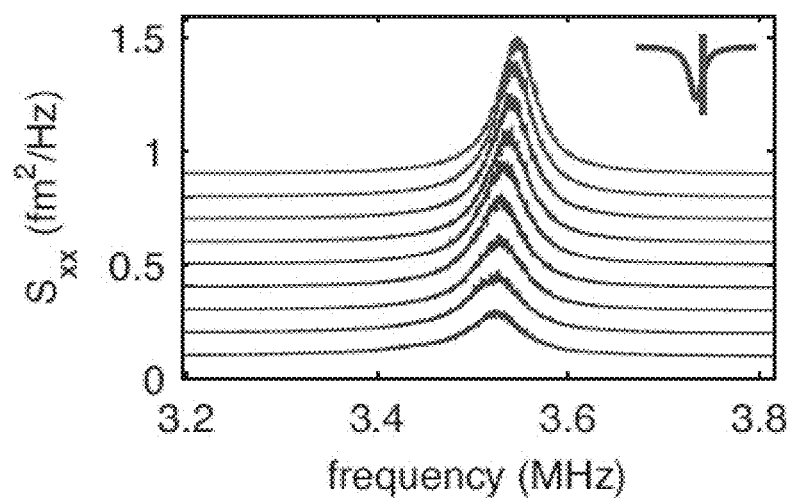
FIG. 18 shows waterfall plot of the RF optical transmission spectra of the mechanical modes in the cooling regime, with the pump-laser a half-linewidth red-detuned from the cavity.
Figure 19:
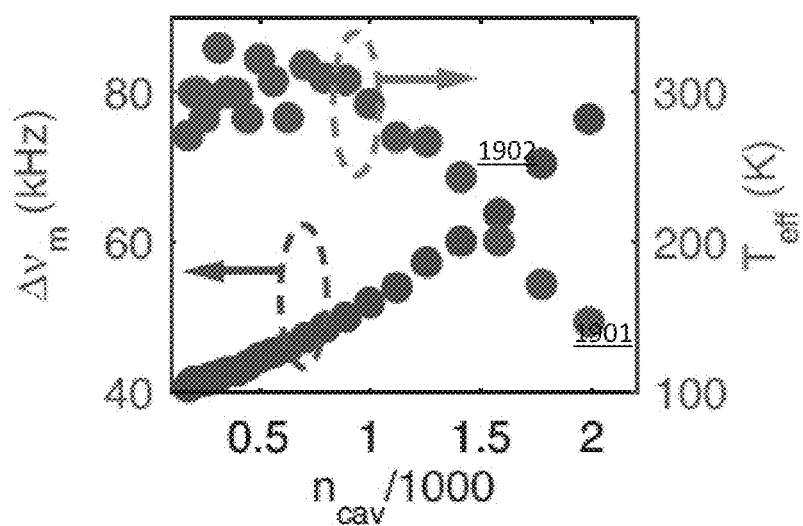
FIG. 19 shows a plot of the higher-frequency 3.6 MHz mechanical mode linewidth and effective temperature versus $n_{cav}$ under red-detuned pumping.

Tuning the cavity such that the pump laser can be blue detuned from the optical mode results in phonon lasing, while red detuning leads to cooling. In the present embodiment of the example system both regimes can be realized. FIG. 16 shows RF-spectra for driving the system with $P_i=250$ µW on the blue side, with detunings below (lower panel) and above (upper panel) the lasing threshold. Above threshold line-narrowing and an enhancement of the mechanical resonance peak by approximately four orders of magnitude can be observed. In the time domain, this corresponds to a large, periodic modulation of the cavity transmission signal, as is evident from the time trace shown in FIG. 17. For red detuning, cooling of the PC motion can be observed. To this end, the fiber taper on one of the cavity PCs are usually mechanically anchored in order to suppress spurious out-of-plane modes and to reduce temporal drift of the fiber taper. One can then lock the cavity a half-linewidth red from the pump laser and monitor RF-spectra while increasing the power $P_i$ launched into the cavity. FIG. 18 shows the PC displacement spectral density $S_{xx}$ for a series of $n_{cav}$. The resonance at 3.55 MHz corresponds to motion of a single PC. The optical damping of the mechanical mode with increasing photon number can be observed which is evident from the increasing linewidth $D_{nm}$ of the resonance (dots (1901) in FIG. 19). By integrating the total transduced power of the mechanical resonance (which is proportional to the phonon occupancy and thus the effective temperature) FIG. 19 shows that in addition to optically-induced damping, there is optical cooling of the mechanical motion, with the effective temperature of the mode (dots (1902) in FIG. 19) reducing to $T_{eff} \approx 150$ K.

Figure 20:
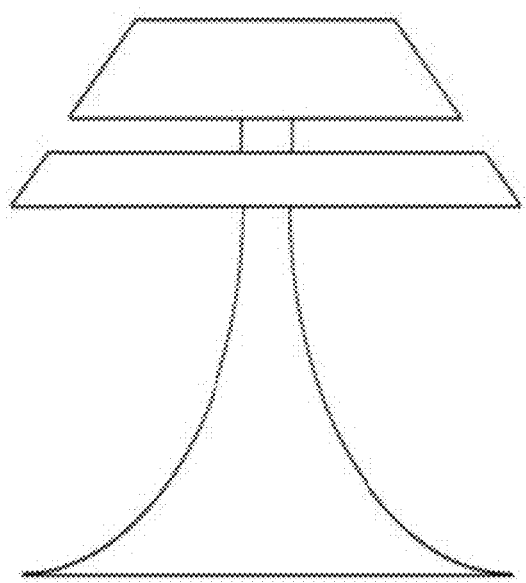
FIG. 20 shows vertical cross-section of an asymmetric, tapered coupled microring cavity for out-of-plane sensing.
Figure 21:
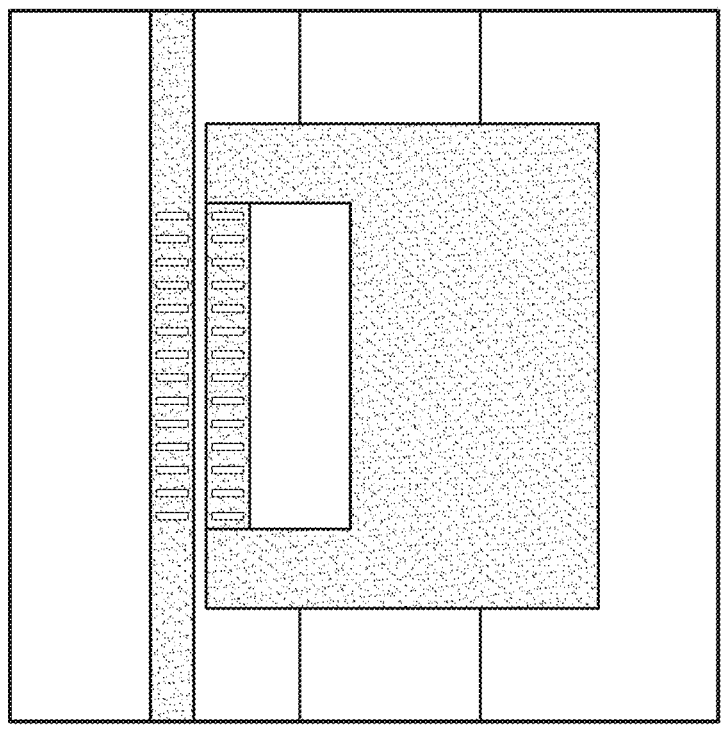
FIGS. 21-22 show asymmetric coupled-nanobeam cavity for in-plane sensing along (FIG. 21) one and (FIG. 22) two in-plane directions.
Figure 22:
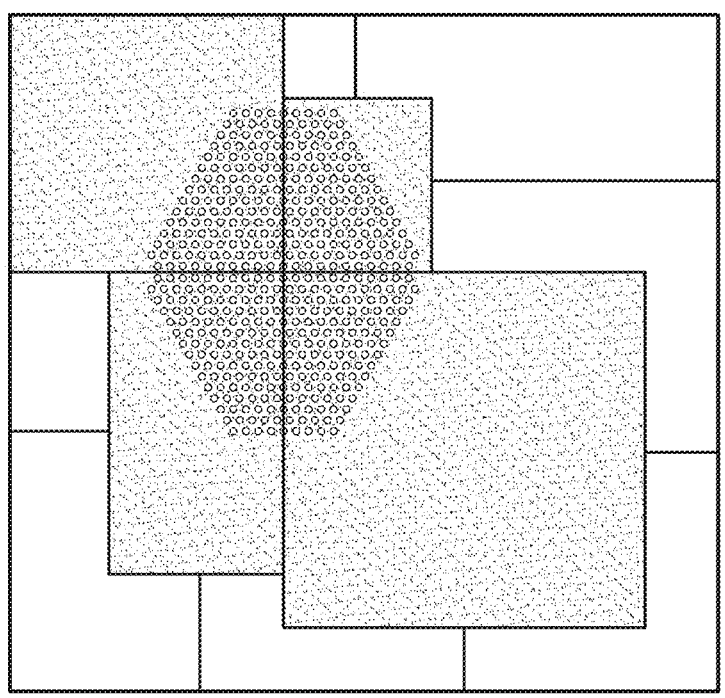

The example embodiment of the PC cavity opto-electromechanical device of FIGS. 1 and 4 can also be configured using coupled microrings with a thickness difference between the top and bottom ring and coupled photonic-crystal nanobeams with thickness difference between the top beam and the bottom beam. Using these modified device geometries a significant difference in either proof mass or spring constant (or both) between the coupled resonators can be achieved which in turn may enable external force or acceleration sensing. The example embodiment of FIG. 20 shows a thickness difference between the top and bottom rings to provide both a proof-mass and stiffness difference between the two ring layers. This new device geometry can be utilized for the measurement of acceleration normal to the surface of the ring geometry. In a similar fashion for example the embodiment of FIG. 21 shows a significant proof-mass and stiffness difference between the two nano-beams. This design enables acceleration sensing in a direction normal to the nano-beam axis in the device plane. FIG. 22 shows a coupled photonic-crystal nano-cavities that is able to probe acceleration along both in-plane dimensions.

The highly-dispersive cavities of the embodiment of FIGS. 20, 21 and 22 can provide a better sensitive readout of mechanical motion, with an optimal mechanical-to-optical transduction gain of $$G = \frac{\delta P}{\delta x} = 4\sqrt{3}\, g_{OM} P_i / (9\Gamma_0)$$

(defined as the power variation of cavity transmission with respect to the mechanical displacement), where $P_i$ is the input optical power and $\Gamma_0$ is the intrinsic linewidth of the optical cavity. Unlike the electrical transduction schemes commonly used in MEMS/NEMS which encounter serious electrical amplifier noise [36, 38-42, 44-48], in such an optical probing scheme it can be straightforward to reach shot-noise-limited detection. The combined effect of high transduction gain and shot-noise-limited detection results in a minimum detectable spectral density of mechanical displacement given by, $S_x = 9q\Gamma_0^2/(16\eta g_{OM}^2 P_i)$ where q and η are the electron charge and detector responsivity, respectively. For a detector with η=1 A/W, 10 µW input power provides a minimum detectable mechanical displacement of $1.5-1.6 \times 10^{-19}$ m/$\sqrt{Hz}$. This value corresponds to a noise floor of 0.06-0.24 nano-g/$\sqrt{Hz}$ for acceleration sensing with a 10-kHz mechanical resonance, which is three orders of magnitude lower than current state-of-the-art MEMS/NEMS devices [41, 44-48]. By improving the optical quality factor further reduction of this noise floor by one order of magnitude can be achieved.

Figure 23:
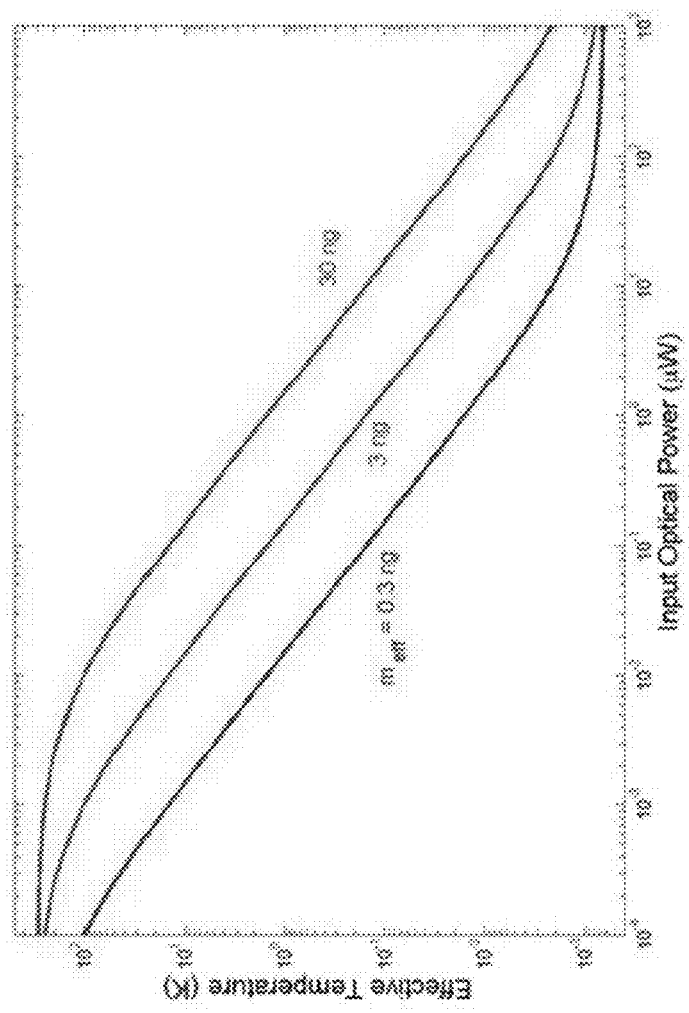
FIG. 23 shows effective temperature as a function of input optical power for the device shown in FIGS. 20-22 assuming an optical and mechanical quality factor of $5 \times 10^6$ and $10^4$, respectively.

The optical force exerted by photons produces a dynamic backaction between the mechanical motion and intracavity optical field, which is able to cool [52] the thermal mechanical motion when the incident laser is located at the red-detuned side of the cavity resonance. FIG. 23 shows the expected effective temperature for the cavity opto-electromechanical devices if they are configured using the embodiment of FIGS. 20 to 22, assuming an optical and mechanical quality factor of $5\times10^6$ and $10^4$ respectively. With a power of only 20 µW, it can be possible to cool the mechanical mode from room temperature down to 1.4, 8.0, 75 mK, respectively, for a mechanical mode with an effective mass of 0.3, 3, and 30 ng. This corresponds to three to five orders of magnitude suppression of thermal mechanical noise Apart from cooling the thermal mechanical motion, the optical wave inside the cavities of the embodiment of FIGS. 20 to 22 can also introduce an optical spring and thus change the effective mechanical stiffness. This approach can be used to improve the mechanical rigidity by three orders of magnitude such that the mechanical stiffness is completely dominated by the optical spring, proving the power of this technique [53]. If the optical Q is improved, a higher spring-tuning efficiency in the cavity opto-electromechanical devices using the embodiments of FIGS. 20-22 can be achieved but with an opposite sign to decrease the stiffness.

In general, sensitive force/acceleration sensing is easier with softer devices (e.g. those with low spring constant) since this increases the mechanical displacement per unit force/acceleration. Conventionally, this can only be realized by reducing the natural mechanical frequency through structure design prior to fabrication. This, however, limits the operation bandwidth of the device. Furthermore, a high mechanical quality factor is required to reduce the thermal mechanical spectral density in the spectral region around DC where the device operates, which in turn limits the operational spectral region to a region far away from the mechanical resonance to prevent the ringing response to external excitations. In contrast, as discussed above, the embodiments of FIGS. 20-22 have the capabilities for engineering mechanical frequency and suppressing mechanical noise independently and simultaneously. Therefore, a person skilled in the art can take advantage of the full bandwidth of the mechanical response. In order to achieve this effect, the combined effect of mechanical cooling and optical spring can be used to lower the mechanical frequency down to a desired value (i.e., ~10-20 kHz) and simultaneously cool the mechanical thermal motions close to the critical-damped regime (with a mechanical Q factor ~0.5). With thermal displacement fluctuation of $\langle (\delta x)^2 \rangle = k_B T_{eff}/k_{eff}$, mechanical displacement $x_s = F_s/k_{eff}$ actuated by external force $F_s = m_{eff} a_s$, the SNR for force/acceleration sensing is given by:

$$SNR = \frac{x_s^2}{\langle (\delta x)^2 \rangle} = \frac{F_s^2}{k_B T_{eff} k_{eff}} = \frac{m_{eff}^2 a_s^2}{k_B T_{eff} k_{eff}}$$

The minimum detectable force/acceleration at frequencies well below the mechanical resonance is then given by $(F_s)_{min} = m_{eff}(a_s)_{min} = (k_B T_{eff} k_{eff})^{1/2}$ at the condition SNR=1.

FIGS. 24 and 25 show $(F_s)_{min}$ and $(a_s)_{min}$ as a function of input optical power at different mass levels, assuming a mechanical resonance of 20 kHz. In general, force sensing favors a small effective mass. As shown in FIG. 24, a 20-µW optical power will result in a force resolution of 9.5 zepto Newton by using a mass of 0.3 nano-gram. This force sensing resolution corresponds to an effective spectral resolution of about 83 yocto-Newton/Hz, which is three orders of magnitude smaller than current state-of-the-art NEMS devices [49-51, 54]. The situation is different for acceleration sensing which favors a large effective mass to produce a large mechanical displacement for a given acceleration. FIG. 25 shows that, with a mass of 3 nano-grams, 20-µW optical power results in an acceleration-sensing resolution of 2.4 nano-g. This value corresponds to an effective resolution of acceleration spectral density about 0.02 nano-gHz 0.2 nano-g/√Hz over a bandwidth of 13 kHz, which can be about 3 orders of magnitude smaller than current state-of-the-art devices [55-60].

Squeezing of mechanical displacement noise below the standard quantum limit can be realized by varying the mechanical potential with a specific time-dependent pattern [61,62], particularly by modulating the input optical power either at twice the mechanical frequency in the linear optomechanical coupling regime [63], or at the mechanical frequency in the quadractic coupling regime [64-66]. In both cases, the squeezing efficiency depends on the co-operativity coefficient $$\frac{\bar{g}^2}{\Gamma_0 \Gamma_m},$$

where $\bar{g} = g_{OM} x_{ZP}$ or $\bar{g} = g' x_{ZP}^2/2$ depending on whether the linear or quadratic optomechanical coupling is used ($x_{ZP} = \sqrt{\hbar/2m_{eff}\Omega_m}$ is the zero-point fluctuation). Our proposed devices exhibit a $\bar{g} = 2\pi(1.6\text{-}6.4)$ MHz for linear optomechanical coupling, corresponding to a cooperativity of $(0.66\text{-}10.6)\times10^3$ for an optical and mechanical Q of $5\times10^6$ and $10^6$, respectively, which falls far into the strong coupling regime and more than two orders of magnitude larger than atomic systems [67]. Consequently, using the embodiment of the FIGS. 20-22, cavity opto-electromechanical devices can provide efficient mechanical squeezing, well below the standard quantum limit, allowing for improved resolution of force/acceleration sensing.

The examples set forth above are provided to give those of ordinary skill in the art a complete disclosure and description of how to make and use the embodiments of the present disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

1. E. F. Nichols and G. F. Hull, "A preliminary communication on the pressure of heat and light radiation," Phys. Rev. 13(5), 307-320 (1901).
2. T. J. Kippenberg and K. J. Vahala, "Cavity Opto-Mechanics," Opt. Express 15(25), 17172-17205 (2007).
3. T. J. Kippenberg and K. J. Vahala, "Cavity Optomechanics: Back-Action at the Mesoscale," Science 321(5893), 1172-1176 (2008).
4. I. Favero and K. Karrai, "Optomechanics of deformable optical cavities," Nat. Photonics 3(4), 201-205 (2009).
5. V. B. Braginskiĭ and A. B. Manukin, Measurement of Weak Forces in Physics Experiments (University of Chicago Press, Chicago, 1977).
6. V. B. Braginskiĭ, F. Y. Khalili, and K. S. Thorne, Quantum Measurement (Cambridge University Press, 1992).
7. J. Rosenberg, Q. Lin, and O. Painter, "Static and dynamic wavelength routing via the gradient optical force," Nat. Photonics 3(8), 478-483 (2009).
8. M. Eichenfield, R. Camacho, J. Chan, K. J. Vahala, and O. Painter, "A picogram- and nanometer-scale photoniccrystal optomechanical cavity," Nature 459(7246), 550-556 (2009).
9. O. Arcizet, P.-F. Cohadon, T. Briant, M. Pinard, and A. Heidman, "Radiation-pressure cooling and optomechanical instability of a micromirror," Nature 444(7115), 71-74 (2006).
10. T. J. Kippenberg, H. Rokhsari, T. Carmon, A. Scherer, and K. J. Vahala, "Analysis of Radiation-Pressure Induced Mechanical Oscillation of an Optical Microcavity," Phys. Rev. Lett. 95(3), 033901 (2005).
11. S. Gigan, H. R. Böhm, M. Paternostro, F. Blaser, G. Langer, J. B. Hertzberg, K. C. Schwab, D. Bäuerle, M. Aspelmeyer, and A. Zeilinger, "Self-cooling of a micromirror by radiation pressure," Nature 444(7115), 67-70 (2006).
12. S. Weis, R. Riviere, S. Deleglise, E. Gavartin, O. Arcizet, A. Schliesser, T. J. Kippenberg, "Optomechanically Induced Transparency," Science 330(6010), 1520-1523 (2010).
13. J. D. Teufel, D. Li, M. S. Allman, K. Cicak, A. J. Sirois, J. D. Whittaker, and R. W. Simmonds, "Circuit cavity electromechanics in the strong-coupling regime," Nature 471 (7337), 204-208 (2011).
14. A. H. Safavi-Naeini, T. P. Mayer Alegre, J. Chan, M. Eichenfield, M. Winger, Q. Lin, J. T. Hill, D. E. Chang, and O. Painter, "Electromagnetically induced transparency and slow light with optomechanics," Nature 472(7341), 69-73 (2011).
15. A. Schliesser, G. Anetsberger, R. Rivière, O. Arcizet, and T. J. Kippenberg, "High-sensitivity monitoring of micromechanical vibration using optical whispering gallery mode resonators," New J. Phys. 10, 095015 (2008).
16. J. Chan, T. P. Mayer Alegre, A. H. Safavi-Naeini, J. T. Hill, A. Krause, S. Gröblacher, M. Aspelmeyer, and O. Painter, "Laser cooling of a nanomechanical oscillator into its quantum ground state," ArXiv:1106.3614v1 (2011).
17. C. A. Regal, J. D. Teufel, and K. W. Lehnert, "Measuring nanomechanical motion with a microwave cavity interferometer," Nat. Physics 4(7), 555-560 (2008).
18. J. D. Teufel, T. Donner, D. Li, J. W. Harlow, M. S. Allman, K. Cicak, A. J. Sirois, J. D. Whittaker, K. W. Lehnert, and R. W. Simmonds, "Sideband cooling of micromechanical motion to the quantum ground state," Nature 475(7356) (2011).
19. K. H. Lee, T. G. McRae, G. I. Harris, J. Knittel, and W. P. Bowen, "Cooling and Control of a Cavity Optoelectromechanical System," Phys. Rev. Lett. 104(12), 123604 (2010).
20. A. H. Safavi-Naeini and O. Painter, "Proposal for an optomechanical travelling wave phonon-photon translator," New J. Phys. 13, 013017 (2011).
21. K. L. Ekinci and M. L. Roukes, "Nanoelectromechanical systems." Rev. Sci. Instrum. 76, 061101 (2005).
22. M. Eichenfield, J. Chan, R. Camacho, K. J. Vahala, and O. Painter, "Optomechanical crystals," Nature 462(7269), 78-82 (2009).
23. A. H. Safavi-Naeini, T. P. Mayer Alegre, M. Winger, and O. Painter, "Optomechanics in an ultrahigh-Q two-dimensional photonic crystal cavity," Appl. Phys. Lett. 97 (18), 181106 (2010).
24. I. W. Frank, P. B. Deotare, M. W. McCutcheon, and M. Lončar, "Programmable photonic crystal nanobeam cavities," Opt. Express 18(8), 8705-8712 (2010).
25. R. Perahia, J. D. Cohen, S. Meenehan, T. P. Mayer Alegre, and O. Painter, "Electrostatically tunable optomechanical "zipper" cavity laser," Appl. Phys. Lett. 97 (19), 191112 (2010).
26. L. Midolo, P. J. van Veldhoven, M. A. Dündar, R. Nötzel, and A. Fiore, "Electromechanical wavelength tuning of double-membrane photonic crystal cavities," Appl. Phys. Lett. 98 (21), 21120 (2011).
27. B.-S. Song, S. Noda, T. Asano, and Y. Akahane, "Ultrahigh-Q photonic double-heterostructure nanocavity," Nature Mater. 4(3), 207-210 (2010).
28. See http://www.comsol.com/29.
29. T. P. Mayer Alegre, R. Perahia, and O. Painter, "Optomechanical zipper cavity lasers: theoretical analysis of tuning range and stability," Opt. Express 18(8), 7872-7885 (2010).
30. C. P. Michael, M. Borselli, T. J. Johnson, C. Chrystal, and O. Painter, "An optical fiber-taper probe for wafer-scale microphotonic device characterization," Opt. Express 15 (8), 4745-4752 (2010).
31. P. Barclay, K. Srinivasan, and O. Painter, "Nonlinear response of silicon photonic crystal microresonators excited via an integrated waveguide and fiber taper," Opt. Express 13(3), 801-820 (2005).
32. D. Kleckner, and D. Bouwmeester, "Sub-kelvin optical cooling of a micromechanical resonator," Nature 444(7115), 75-78 (2006).
33. G. Binnig, et al., "Atomic force microscope", Phys. Rev. Lett. 56, 930 (1986).
34. T. R. Albrecht, et al., "Frequency modulation detection using high-Q cantilevers for enhanced force microscope sensitivity", J. Appl. Phys. 69, 668 (1991).
35. D. J. Muller, et al, "Atomic force microscopy as a multifunctional molecule toolbox in nanobiotechnology," Nature Nanotech. 3, 261 (2008).
36. N. Yazdi, et al, "Micromachined inertial sensors", Proc. IEEE 86, 1640 (1998).
37. W. J. Fleming, "New automotive sensors—a review", IEEE Sensors J. 8, 1900 (2008).
38. T. Kenny, "Nanometer-Scale Force Sensing with MEMS Devices", IEEE Sensors J. 1, 148 (2001).
39. K. L. Ekinci, et al., "Nanoelectromechanical systems", Rev. Sci. Inst. 76, 061101 (2005).
40. D. Lopez, et al., "MEMS-based force sensor: Design and applications", Bell Lab. Techni. J. 10, 61 (2005).
41. G. Krishnan, et al, "Micromachined high-resolution accelerometers", J. Ind. Inst. Sci. 87, 333 (2007).

42. F. Mohd-Yasin, et al, "Noise in MEMS", Meas. Sci. Technol. 21, 012001 (2010).
43. T. B. Gabrielson, "Mechanical-thermal noise in micromachined acoustic and vibration sensors", IEEE Trans. Elect. Dev. 40, 903 (1993).
44. H. Kulah, et al, "Noise analysis and characterization of a sigma-delta capacitive microaccelerometer", IEEE J. Sol-Stat. Circ. 41, 352 (2006).
45. J. Wu, et al, "A low-noise low-offset capacitive sensing amplifier for a 50 g Hz monolithic CMOS MEMS accelerometer", IEEE J. Sol. Stat. Circ. 39, 722 (2004).
46. N. Yazdi et al, "Precision readout circuits for capacitive microaccelerometers", Proc. IEEE Sensors, pp. 28 (2004).
47. N. Yazdi, et al, "Performance limits of a closed-loop micro-g silicon accelerometer with deposited rigid electrodes", Prof. Int. Conf. Microelectronics, pp. 313 (2000).
48. L. Yin, et al, "A low-noise CMOS interface circuit for closed-loop accelerometer", Proc. IEEE Conf. Nano/Micro Eng. Mol. Sys., pp. 502 (2010).
49. T. D. Stowe, et al, "Attonewton force detection using ultrathin silicon cantilevers", Appl. Phys. Lett. 71, 288 (1997).
50. H. J. Mamin, et al, "sub-attonewton force detection at milikelvin temperature", Appl. Phys. Lett. 79, 3358 (2001).
51. J. L. Arlett, et al, "Self-sensing micro- and nanocantilevers with attonewton-scale force resolution," Nano. Lett. 6, 1000 (2006).
52. Q. Lin, et al, "Mechanical Oscillation and Cooling Actuated by the Optical Gradient Force", Phys. Rev. Lett. 103, 103601 (2009).
53. J. Rosenberg, et al, "Static and dynamic wavelength routing via the gradient optical force", Nature Photon. 3, 478 (2009).
54. 26. Y. G. Jiang, et al, "Fabrication of piezoresistive nanocantilevers for ultra-sensitive force detection", Meas. Sci. Technol. 19, 084011 (2008).
55. E. B. Cooper, et al, "High-resolution micromachine interferometric accelerometer", Appl. Phys. Lett. 76, 3316 (2000).
56. C. Liu, et al, "A high-precision, wide-bandwidth micromachined tunneling accelerometer", J. MEMS. 10, 425 (2001).
57. N. C. Loh, et al, "Sub-10 cm3 interferometric accelerometer with nano-g resolution", J. MEMS. 11, 182 (2002).
58. N. Yazdi, et al, "A high-sensitivity silicon accelerometer with a folded-electrode structure", J. MEMS. 12, 479 (2003).
59. S. Tadigadapa, et al, "Piezoelectric MEMS sensors: state-of-the-art and perspectives", Meas. Sci. Technol. 20, 092001 (2009).
60. P. Zwahlen, et al, "Navigation grade MEMS accelerometer", Proc. IEEE Conf. MEMS, pp. 631 (2010).
61. V. B. Braginsky, et al, "Quantum nondemolition measurements", Science 209, 547 (1980).
62. F. Marquardt and S. M. Girvin, "Optomechanics", Physics 2, 40 (2009).
63. A. Mari and J. Eisert, "Gently modulating optomechanical systems", Phys. Rev. Lett. 103, 213603 (2009).
64. M. J. Woolley, et al, "Nanomechanical squeezing with detection via a microwave cavity," Phys. Rev. A 78, 062303 (2008).
65. A. Serafini, et al, "Generation of continuous variable squeezing and entanglement of tapped ions in time-varying potentials", Quantum Inf. Process. 8, 619 (2009).
66. A. Nunnenkamp, et al, "Cooling and squeezing via quadratic optomechanical coupling," Phys. Rev. A 82, 021806 (R) (2010).
67. K. W. MURCH, et al, "Observation of quantum-measurement backaction with an ultracold atomic gas", Nature Phys. 4, 561 (2008).

The invention claimed is:

1. A system comprising:
   a first photonic crystal (PC) having a first inner edge and a first outer edge, the first PC comprising a first plurality of holes;
   a second PC having a second inner edge and a second outer edge, the second PC comprising a second plurality of holes, the second inner edge of the second PC being adjacent to the first inner edge of the first PC;
   at least one of a waveguide section and a wave trap section formed between the first PC and the second PC, wherein the wave trap section is configured to trap an electromagnetic wave within a cavity; and
   a first pair of capacitively coupled metal contacts located outside an optical mode volume, the first pair of capacitively coupled metal contacts comprising a first metal contact and a second metal contact, the second metal contact contacting the first outer edge of the first PC,
   wherein a first electrical voltage is adapted to be applied across the first pair of metal contacts, and
   wherein the first PC is adapted to move as a function of at least one of the first electrical voltage and the electromagnetic wave such that the at least one of the waveguide section and the wave trap section contracts or expands.

2. The system of claim 1, wherein the first plurality of holes and the second plurality of holes are arranged in a periodic array.

3. The system of claim 2, wherein a lattice constant of the periodic array is varied throughout the first PC and the second PC, the varied lattice constant configuring the waveguide section and the wave trap section.

4. The system of claim 3, wherein a size of the first plurality of holes and the second plurality of holes, a shape of the first plurality of holes and the second plurality of holes, and/or separation between the first plurality of holes and the second plurality of holes of the periodic array is varied to change electromagnetic wave propagation properties of the system.

5. The system of claim 4, wherein the size of each hole of the first plurality of holes and the second plurality of holes is larger near the wave trap section along the first inner edge of the first PC and the second inner edge of the second PC.

6. The system of claim 4, wherein spacing between the first plurality of holes and the second plurality of holes is closer near the wave trap section along the first inner edge of the first PC and the second inner edge of the second PC.

7. The system of claim 1, wherein the wave trap section is a section between two waveguide sections, thus forming the cavity.

8. The system of claim 1, further comprising a second pair of capacitively coupled metal contacts located outside the optical mode volume, the second pair of contacts comprising a third metal contact and a fourth metal contact, the third metal contact contacting the second outer edge of the second PC, wherein a second electrical voltage is adapted to be applied across the second pair of metal contacts.

9. The system of claim 8, wherein the second PC is adapted to move as a function of at least one of the second electrical voltage and the electromagnetic wave such that the at least one of the waveguide section and the wave trap section contracts or expands.

10. The system of claim 1, wherein the second PC is fixed during movement of the first PC.

11. The system of claim 1, wherein a resonant frequency of the system is tuned as a function of an arrangement of the first plurality of holes in the first PC and the second plurality of holes in the second PC, wherein the electromagnetic wave is trapped in the wave trap section at the resonant frequency.

12. The system of claim 1, wherein the electromagnetic wave is a light wave or a microwave.

13. The system of claim 12, further comprising a laser light source to provide the light wave.

14. The system of claim 1, further comprising trenches to electrically isolate the first metal contact from the second metal contact, the trenches being formed through a semiconductive silicon layer and into a non-conductive silicon dioxide layer, thus allowing high-bandwidth changes to the first electrical voltage.

15. The system of claim 8, further comprising trenches to electrically isolate the third metal contact from the fourth metal contact, the trenches being formed through a semiconductive silicon layer and into a non-conductive silicon dioxide layer, thus allowing high-bandwidth changes to the second electrical voltage.

16. The system of claim 1, wherein a mass of the system is selected such that a back-action effect as a consequence of the electromagnetic wave is able to change intrinsic parameters of the system.

17. The system of claim 16, wherein the intrinsic parameters comprise temperature and resonance frequency of a mechanical mode.

18. The system of claim 1, wherein a separation distance between the first pair of capacitively coupled metal contacts and the optical mode volume allows for low-loss transmission or low-loss trapping of the electromagnetic wave.

19. The system of claim 8, wherein a separation distance between the second pair of capacitively coupled metal contacts and the optical mode volume allows for low-loss transmission or low-loss trapping of the electromagnetic wave.

20. A method comprising:
propagating an electromagnetic wave through a waveguide section formed between a first photonic crystal (PC) and a second PC;
trapping the electromagnetic wave within a wave trap section formed between the first PC and the second PC, thereby causing the waveguide and the wave trap section to contract or expand; and
applying a first electrical voltage across a first pair of capacitively coupled metal contacts, the first pair of capacitively coupled metal contacts comprising a first metal contact and a second metal contact, wherein the application of the first electrical voltage causes the waveguide section and the wave trap section between the first PC and the second PC to expand or contract.

21. The method of claim 20, further comprising applying a second electrical voltage across a second pair of capacitively coupled metal contacts, the second pair of capacitively coupled metal contacts comprising a third metal contact and a fourth metal contact, wherein the application of the second electrical voltage causes a cavity between the first PC and the second PC to expand or contract.

22. A method to change an optical resonance frequency, the method comprising:
applying an electrical voltage across a first pair of capacitively coupled metal contacts comprising a first metal contact and a second metal contact, the second metal contact contacting a first outer edge of a first photonic crystal (PC);
changing position of the first PC as a function of the applied electrical voltage across the first pair of metal contacts, thus causing a waveguide section and a wave trap section between the first PC and the second PC to expand or contract; and
shining light to the waveguide section and the wave trap section.

23. The method of claim 22, further comprising applying an electrical voltage across a second pair of capacitively coupled metal contacts comprising a third metal contact and a fourth metal contact, the fourth metal contact contacting a second outer edge of a second PC.

24. The system of claim 1, wherein the cavity is a coupled microring cavity comprising a top ring and a bottom ring.

25. The system of claim 24, wherein the microring cavity is tapered such that there is a thickness difference between the top ring and the bottom ring.

26. An apparatus comprising:
a first photonic crystal (PC) comprising a first periodic array of holes;
a second PC comprising a second periodic array of holes;
a slot between the first PC and the second PC, wherein the slot includes at least one of a waveguide section configured to guide an electromagnetic wave and a wave trap section configured to confine the electromagnetic wave within a cavity;
one or more pairs of capacitively coupled metal contacts bounding the first PC and the second PC configured to electromechanically control a motion of the first PC and the second PC and a width of the slot such that the at least one of the waveguide section and the wave trap section contracts or expands; and
one or more trenches etched between the capacitively coupled metal contacts of the one or more pairs, the trenches configured to electrically isolate the capacitively coupled metal contacts of each pair.

27. The apparatus of claim 26, wherein the first PC, the second PC, and the slot formed between the first and second PC are suspended on one or more struts.

28. The apparatus of claim 27, wherein an optical field is localized on the one or more struts.

29. The apparatus of claim 26, wherein the cavity is a coupled microring cavity comprising a top ring and a bottom ring that is tapered such that there is a thickness difference between the top ring and the bottom ring.

30. The apparatus of claim 26, wherein the apparatus is integrated with a silicon chip.

* * * * *

UNITED STATES PATENT AND TRADEMARK OFFICE
CERTIFICATE OF CORRECTION

PATENT NO. : 8,849,075 B2
APPLICATION NO. : 13/673916
DATED : September 30, 2014
INVENTOR(S) : Painter et al.

It is certified that error appears in the above-identified patent and that said Letters Patent is hereby corrected as shown below:

On the Title Page

On Page 2, in item (56), under "OTHER PUBLICATIONS", in Column 1, Line 27, delete "acuation" and insert -- actuation --, therefor.

On Page 2, in item (56), under "OTHER PUBLICATIONS", in Column 2, Line 63, delete "crystan" and insert -- crystal --, therefor.

In the Drawings

In Fig. 24, Sheet 21 of 21, delete "(uW)" and insert -- (μW) --, therefor.

In Fig. 25, Sheet 21 of 21, delete "(uW)" and insert -- (μW) --, therefor.

In the Specification

In Column 6, Line 23, delete "£" and insert -- ε --, therefor.

In Column 8, Line 32, delete "Joannopolous" and insert -- Joannopoulos --, therefor.

In Column 8, Line 42, delete "$\kappa_c$)" and insert -- $\kappa_e$) --, therefor.

In Column 13, Line 8, delete "noise" and insert -- noise. --, therefor.

In Column 14, Line 13, delete "quadractic" and insert -- quadratic --, therefor.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,849,075 B2

In Column 15, Line 14, delete "Braginskiĭĭ" and insert -- Braginsky --, therefor.

In Column 15, Line 14, delete "Braginskiĭĭ" and insert -- Braginsky --, therefor.

In Column 17, Line 25, delete "milikelvin" and insert -- millikelvin --, therefor.